United States Patent
Ahn et al.

(10) Patent No.: US 7,324,498 B2
(45) Date of Patent: Jan. 29, 2008

(54) APPARATUS AND METHOD FOR REORDERING TRAFFIC FLOW TEMPLATES IN A MOBILE COMMUNICATION SYSTEM

(75) Inventors: Hong-Jin Ahn, Seoul (KR); Jin-Moo Kim, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 1002 days.

(21) Appl. No.: 10/348,955

(22) Filed: Jan. 23, 2003

(65) Prior Publication Data

US 2003/0169771 A1  Sep. 11, 2003

(30) Foreign Application Priority Data

Jan. 24, 2002  (KR) ............... 10-2002-0004114

(51) Int. Cl.
*H04J 3/24* (2006.01)
(52) U.S. Cl. .................. 370/349; 370/395.31
(58) Field of Classification Search ........ 370/497, 370/349, 395.31
See application file for complete search history.

(56) References Cited

U.S. PATENT DOCUMENTS

| | | | | |
|---|---|---|---|---|
| 4,815,075 | A * | 3/1989 | Cameron ................. | 370/497 |
| 5,509,051 | A * | 4/1996 | Barnett et al. ............ | 455/443 |
| 5,956,643 | A * | 9/1999 | Benveniste ............ | 455/452.1 |
| 6,438,595 | B1 * | 8/2002 | Blumenau et al. ........ | 709/226 |
| 6,442,401 | B1 * | 8/2002 | Behan ................. | 455/552.1 |
| 6,728,304 | B2 * | 4/2004 | Brown et al. ........... | 375/148 |
| 7,123,920 | B1 * | 10/2006 | Faccin et al. ........... | 455/450 |
| 2001/0027490 | A1 * | 10/2001 | Fodor et al. ........... | 709/238 |
| 2001/0047423 | A1 * | 11/2001 | Shao et al. ............ | 709/235 |
| 2002/0010758 | A1 * | 1/2002 | Chan .................. | 709/218 |
| 2002/0062379 | A1 * | 5/2002 | Widegren et al. ......... | 709/227 |
| 2002/0087350 | A1 * | 7/2002 | Miida et al. ............. | 705/1 |
| 2002/0120749 | A1 | 8/2002 | Widegren et al. ......... | 709/227 |
| 2002/0142782 | A1 * | 10/2002 | Berliner et al. .......... | 455/456 |

(Continued)

FOREIGN PATENT DOCUMENTS

EP  1273134  11/2004

(Continued)

*Primary Examiner*—Kwang Bin Yao
*Assistant Examiner*—Andrew Lai
(74) *Attorney, Agent, or Firm*—Roylance, Abrams, Berdo & Goodman, L.L.P.

(57) ABSTRACT

An apparatus and method for reordering traffic flow templates (TFTs) in a mobile communication system. The apparatus and method include a primary GPRS tunneling protocol (GTP) tunnel for transmitting and receiving packet data to and from a mobile station and one or more secondary GTP tunnels having the same mobile station address as the primary GTP tunnel and each being divided into different TFTs. The TFTs each include different packet filter contents so that the secondary GTP tunnels are separated through TFT packet filtering. A controller is adapted to sequentially perform TFT packet filtering on input packet data for the TFTs, manage statistical data of packet data successfully TFT packet filtered according to the TFTs, and reorder an order of the TFTs by comparing the statistical data of the packet data successfully TFT packet filtered for the TFTs if a preset period expires. A memory is adapted to store packet filter contents for each of the TFTs, and store statistical data for packet data successfully TFT packet filtered for each of the TFTs.

13 Claims, 22 Drawing Sheets

U.S. PATENT DOCUMENTS

2003/0081547 A1* 5/2003 Ho .............................. 370/229
2004/0151155 A1* 8/2004 Jouppi ........................ 370/349

FOREIGN PATENT DOCUMENTS

| WO | 02073989 | 3/2001 |
| WO | WO 01/56250 | 8/2001 |
| WO | WO 01/78328 | 10/2001 |
| WO | WO 01/91389 | 11/2001 |
| WO | 02082781 | 4/2002 |
| WO | WO 02/41592 | 5/2002 |
| WO | 03007544 | 7/2002 |

\* cited by examiner

| 7 | 6 | 5 | 4 | 3 | 2 | 1 | 0 |
|---|---|---|---|---|---|---|---|
| TRAFFIC FLOW TEMPLATE TYPE ||||||||
| LENGTH OF TRAFFIC FLOW TEMPLATE TYPE ||||||||
| TFT OPERATION CODE ||| 0 | NUMBER OF PACKET FILTERS ||||
| PACKET FILTER IDENTIFIER 1 ||||||||
| PACKET FILTER EVALUATION PRECEDENCE 1 ||||||||
| LENGTH OF PACKET FILTER CONTENTS 1 ||||||||
| PACKET FILTER CONTENTS 1 ||||||||
| PACKET FILTER IDENTIFIER 2 ||||||||
| PACKET FILTER EVALUATION PRECEDENCE 2 ||||||||
| LENGTH OF PACKET FILTER CONTENTS 2 ||||||||
| PACKET FILTER CONTENTS 2 ||||||||
| . . . . . . ||||||||

FIG.6

RELATED ART

| 7 | 6 | 5 | 4 | 3 | 2 | 1 | 0 |
|---|---|---|---|---|---|---|---|
| TRAFFIC FLOW TEMPLATE TYPE ||||||||
| LENGTH OF TRAFFIC FLOW TEMPLATE TYPE ||||||||
| TFT OPERATION CODE ||| 0 | NUMBER OF PACKET FILTERS ||||

FIG.7

| 7 | 6 | 5 | 4 | 3 | 2 | 1 | 0 |
|---|---|---|---|---|---|---|---|
| TRAFFIC FLOW TEMPLATE TYPE ||||||||
| LENGTH OF TRAFFIC FLOW TEMPLATE TYPE ||||||||
| TFT OPERATION CODE ||| 0 | NUMBER OF PACKET FILTERS ||||
| PACKET FILTER IDENTIFIER 1 ||||||||
| PACKET FILTER IDENTIFIER 2 ||||||||
| . . . . . . ||||||||
| PACKET FILTER IDENTIFIER N ||||||||

FIG.8

RELATED ART

| TFT PACKET FILTERING CALCULATIONS #1 (PROCEDURE #1) | | | |
|---|---|---|---|
| TFT BEFORE REORDERING | CALCULATIONS | TFT AFTER REORDERING | CALCULATIONS |
| 1 | 1000 | 1 | 1000 |
| 2 | 800 | 2 | 800 |
| 3 | 3600 | 3 | 3600 |
| 4 | 3200 | 4 | 3200 |
| 5 | 2500 | 6 | 7500000 |
| 6 | 9000000 | 5 | 3000 |
| 7 | 21000 | 7 | 21000 |
| TOTAL CALCULATIONS BEFORE REORDERING | 9032100 | TOTAL CALCULATIONS AFTER REORDERING | 7532600 |
| | | PERFORMANCE IMPROVEMENT | 19.9068% |

FIG.16

| TFT PACKET FILTERING CALCULATIONS #2 (PROCEDURE #1) | | | |
|---|---|---|---|
| TFT BEFORE REORDERING | CALCULATIONS | TFT AFTER REORDERING | CALCULATIONS |
| 1 | 1000000 | 1 | 1000000 |
| 2 | 2000000 | 2 | 2000000 |
| 3 | 3000000 | 3 | 3000000 |
| 4 | 4000000 | 4 | 4000000 |
| 5 | 5000 | 6 | 5000000 |
| 6 | 6000000 | 5 | 6000 |
| 7 | 7000000 | 7 | 7000000 |
| TOTAL CALCULATIONS BEFORE REORDERING | 23005000 | TOTAL CALCULATIONS AFTER REORDERING | 22006000 |
| | | PERFORMANCE IMPROVEMENT | 4.5397% |

FIG.17

| TFT PACKET FILTERING CALCULATIONS #3 (PROCEDURE #1) | | | |
|---|---|---|---|
| TFT BEFORE REORDERING | CALCULATIONS | TFT AFTER REORDERING | CALCULATIONS |
| 1 | 1 | 1 | 1 |
| 2 | 2 | 2 | 2 |
| 3 | 3 | 3 | 3 |
| 4 | 4 | 4 | 4 |
| 5 | 5 | 6 | 5000 |
| 6 | 6000 | 5 | 6 |
| 7 | 7 | 7 | 7 |
| TOTAL CALCULATIONS BEFORE REORDERING | 6022 | TOTAL CALCULATIONS AFTER REORDERING | 5023 |
| | | PERFORMANCE IMPROVEMENT | 19.8885% |

FIG.18

| TFT PACKET FILTERING CALCULATIONS #4 (PROCEDURE #1) | | | |
|---|---|---|---|
| TFT BEFORE REORDERING | CALCULATIONS | TFT AFTER REORDERING | CALCULATIONS |
| 1 | 1000000 | 1 | 1000000 |
| 2 | 2000000 | 2 | 2000000 |
| 3 | 3000000 | 3 | 3000000 |
| 4 | 4000000 | 4 | 4000000 |
| 5 | 5 | 6 | 5000 |
| 6 | 6000 | 5 | 6 |
| 7 | 700000 | 7 | 700000 |
| TOTAL CALCULATIONS BEFORE REORDERING | 10706005 | TOTAL CALCULATIONS AFTER REORDERING | 10705006 |
| | | PERFORMANCE IMPROVEMENT | 0.0001% |

FIG.19

| TFT PACKET FILTERING CALCULATIONS #5 (PROCEDURE #1) | | | |
|---|---|---|---|
| TFT BEFORE REORDERING | CALCULATIONS | TFT AFTER REORDERING | CALCULATIONS |
| 1 | 1 | 2 | 1000 |
| 2 | 2000 | 3 | 2000000 |
| 3 | 3000000 | 4 | 3000000000 |
| 4 | 4000000000 | 5 | 4000000000000 |
| 5 | 5000000000000 | 6 | 5000000000000000 |
| 6 | 6000000000000000 | 7 | 6000000000000000000 |
| 7 | 7000000000000000000 | 1 | 7 |
| TOTAL CALCULATIONS BEFORE REORDERING | 7006005004003002001 | TOTAL CALCULATIONS AFTER REORDERING | 6005004003002001007 |
| | | PERFORMANCE IMPROVEMENT | 16.6669% |

FIG.20

| TFT PACKET FILTERING CALCULATIONS #6 (PROCEDURE #2) | | | |
|---|---|---|---|
| TFT BEFORE REORDERING | CALCULATIONS | TFT AFTER REORDERING | CALCULATIONS |
| 1 | 1000 | 6 | 1500000 |
| 2 | 800 | 7 | 6000 |
| 3 | 3600 | 3 | 3600 |
| 4 | 3200 | 1 | 4000 |
| 5 | 2500 | 4 | 4000 |
| 6 | 9000000 | 5 | 3000 |
| 7 | 21000 | 2 | 2800 |
| TOTAL CALCULATIONS BEFORE REORDERING | 9032100 | TOTAL CALCULATIONS AFTER REORDERING | 1555800 |
| | | PERFORMANCE IMPROVEMENT | 82.7748% |

FIG.23

| TFT PACKET FILTERING CALCULATIONS #7 (PROCEDURE #2) | | | |
|---|---|---|---|
| TFT BEFORE REORDERING | CALCULATIONS | TFT AFTER REORDERING | CALCULATIONS |
| 1 | 1000000 | 1 | 1000000 |
| 2 | 2000000 | 2 | 2000000 |
| 3 | 3000000 | 3 | 3000000 |
| 4 | 4000000 | 4 | 4000000 |
| 5 | 5000 | 6 | 5000000 |
| 6 | 6000000 | 7 | 6000000 |
| 7 | 7000000 | 5 | 7000 |
| TOTAL CALCULATIONS BEFORE REORDERING | 23005000 | TOTAL CALCULATIONS AFTER REORDERING | 21007000 |
| | | PERFORMANCE IMPROVEMENT | 8.6851% |

FIG.24

| TFT PACKET FILTERING CALCULATIONS #8 (PROCEDURE #2) | | | |
|---|---|---|---|
| TFT BEFORE REORDERING | CALCULATIONS | TFT AFTER REORDERING | CALCULATIONS |
| 1 | 1 | 6 | 1000 |
| 2 | 2 | 1 | 2 |
| 3 | 3 | 2 | 3 |
| 4 | 4 | 3 | 4 |
| 5 | 5 | 4 | 5 |
| 6 | 6000 | 5 | 6 |
| 7 | 7 | 7 | 7 |
| TOTAL CALCULATIONS BEFORE REORDERING | 6022 | TOTAL CALCULATIONS AFTER REORDERING | 1027 |
| | | PERFORMANCE IMPROVEMENT | 82.9459% |

FIG.25

| TFT PACKET FILTERING CALCULATIONS #9 (PROCEDURE #2) | | | |
|---|---|---|---|
| TFT BEFORE REORDERING | CALCULATIONS | TFT AFTER REORDERING | |
| 1 | 1000000 | 1 | 1000000 |
| 2 | 2000000 | 2 | 2000000 |
| 3 | 3000000 | 3 | 3000000 |
| 4 | 4000000 | 4 | 4000000 |
| 5 | 5 | 7 | 500000 |
| 6 | 6000 | 5 | 6000 |
| 7 | 700000 | 6 | 7 |
| TOTAL CALCULATIONS BEFORE REORDERING | 10706005 | TOTAL CALCULATIONS AFTER REORDERING | 10506007 |
| | | PERFORMANCE IMPROVEMENT | 1.8681% |

FIG.26

| TFT PACKET FILTERING CALCULATIONS #10 (PROCEDURE #2) | | | |
|---|---|---|---|
| TFT BEFORE REORDERING | CALCULATIONS | TFT AFTER REORDERING | CALCULATIONS |
| 1 | 1 | 7 | 10000000000000000000 |
| 2 | 2000 | 6 | 2000000000000000 |
| 3 | 3000000 | 5 | 3000000000000 |
| 4 | 4000000000 | 4 | 4000000000 |
| 5 | 5000000000000 | 3 | 5000000 |
| 6 | 6000000000000000 | 2 | 6000 |
| 7 | 7000000000000000000 | 1 | 7 |
| TOTAL CALCULATIONS BEFORE REORDERING | 7006005004003002001 | TOTAL CALCULATIONS AFTER REORDERING | 10020030040050060007 |
| | | PERFORMANCE IMPROVEMENT | 85.6979% |

FIG.27

APPARATUS AND METHOD FOR REORDERING TRAFFIC FLOW TEMPLATES IN A MOBILE COMMUNICATION SYSTEM

PRIORITY

This application claims priority under 35 U.S.C. § 119 to an application entitled "Apparatus and Method for Reordering Traffic Flow Templates in a Mobile Communication System" filed in the Korean Industrial Property Office on Jan. 24, 2002 and assigned Ser. No. 2002-4114, the contents of which are incorporated herein by reference.

BACKGROUND OF THE INVENTION

1. Field of the Invention

The present invention relates, in general, to a mobile communication system, and in particular, to an apparatus and method for reordering traffic flow templates in a mobile communication system using traffic flow templates.

2. Description of the Related Art

A universal mobile telecommunications system (UMTS) mobile communication system is a typical $3^{rd}$ generation mobile communication system. The UMTS system supports not only a voice service but also a packet data service, and further supports high-speed data communication and moving picture communication.

FIG. 1 illustrates a block diagram of a general UMTS network structure. Referring to FIG. 1, a mobile station (MS) 111, connected to a UMTS terrestrial radio access network (UTRAN) 113, processes a call and supports both a circuit service (CS) and a packet service (PS). The UTRAN 113, comprises a Node B (not shown) and a radio network controller (RNC) (not shown), is connected to the mobile station 111 via a Uu interface, and the RNC is connected to a service General Packet Radio Service (GPRS) support node (SGSN) 115 via a interface unit (Iu) interface. Here, the GPRS is a packet data service operating in the UMTS network. The UTRAN 113 provides protocol translation to transmit radio data or control messages, transmitted by the mobile station 111 over the air, to a core network (CN) using a GPRS tunneling protocol (GTP). Here, the, core network includes the SGSN 115 and a gateway GPRS support node (GGSN) 119.

The SGSN 115 is a network node for managing subscriber information and location information of the mobile station 111. The SGSN 115, is connected to the UTRAN 113 via the Iu interface and the GGSN 119 via a Gn interface, and exchanges data and control messages with the UTRAN 113 and the GGSN 119. The SGSN 115, is also connected to a home location register (HLR) 117 via a Gr interface, and manages the subscriber information and location information of the mobile station 111.

The home location register 117 stores subscriber information and routing information for a packet domain. The home location register 117 is connected to the SGSN 115 via the Gr interface and the GGSN 119 via a Gc interface. The home location register 117 can be located in another public land mobile network (PLMN) and is capable of handling a roaming service for the mobile station 111. Further, the GGSN 119, located at an end of the GTP in the UMTS network, is connected via a Gi interface to an external network, e.g., the Internet 121, a packet domain network (PDN), or another PLMN.

A block diagram of an UMTS core network, in which traffic flow templates (TFTs) are used, will be described with reference to FIG. 2.

FIG. 2 is a block diagram illustrating a general UMTS core network using TFTs. It should be noted that the term TFTs is used in reference to performing packet filtering using TFTs. TFTs is performed in the UMTS core network. The use of the TFTs will be described herein below. A packet data protocol (PDP) context is classified into a primary PDP context and a secondary PDP context. The secondary PDP context exists only when a PDP context having the same information as the secondary PDP context, i.e., the primary PDP context exists. That is, since the secondary PDP context reuses the intact information of the primary PDP context, the secondary PDP context is generated after the generation of the primary PDP context. The primary PDP context and the secondary PDP context are identical to each other based on the information actually used. However, the primary and secondary contexts are different from each other based on a respective GTP tunnel which transmits packet data.

Particularly, in the UMTS core network, when the secondary PDP context is activated, the TFT information is used as a filter for distinguishing the primary PDP context form the secondary PDP context. As illustrated in FIG. 2, a UMTS core network 200, or a wideband code division multiple access (WCDMA) core network, has 7 TFTs stored therein, and generates a total of 8 GTP tunnels which takes into consideration secondary PDP contexts corresponding to the 7 TFTs. Internet protocol (IP) packet data received from an external network, e.g., the Internet 121, is applied to the GGSN 119 via the Gi interface. The GGSN 119 has 7 TFTs, e.g., TFT1 to TFT7 stored therein. A path used for the IP packet data received via the Gi interface is determined via the stored 7 TFTs by using packet filtering. The IP packet data filtered using the TFTs in the GGSN 119 is transmitted to the SGSN 115 via the determined path, i.e., the determined GTP tunnel, and the SGSN 115 transmits the IP packet data received from the GGSN 119 to an RAN 211 via the Iu interface via the corresponding GTP tunnel.

FIG. 3 illustrates an example of a general TFT format. Before discussing the TFT format of FIG. 3, a general discussion of how a TFT is generated will be discussed. A TFT is generated in the mobile station 111, and the generated TFT is transmitted to the GGSN 119 via the UTRAN 113 and the SGSN 115. The GGSN 119 filters packet data received via an external network, for example, the Internet 121, and uses the TFT to distinguish a primary GTP tunnel from a secondary GTP tunnel, thereby searching for a GTP tunnel through which the packet data will be actually transmitted. The primary GTP tunnel using the primary PDP context and the secondary GTP tunnel using the secondary PDP context are identical to each other for a PDP address. Therefore, in the case where no TFT exists, it is impossible to determine a GTP tunnel to transmit the packet data. For example, it is impossible to determine whether the packet data is to be transmitted through the primary GTP tunnel or the secondary GTP tunnel.

Further, the TFT can have, for example, a total of 8 packet filters identified by unique packet filter identifiers (IDs). Each packet filter has a unique evaluation precedence index for all TFTs associated with the PDP contexts sharing the same PDP address. The evaluation precedence index has a specific value between 255 and 0. The mobile station 111 manages a packet filter ID and an evaluation precedence index of a packet filter, and generates the contents of the packet filter. In addition, the TFT is associated with the PDP context on a one-to-one basis in a secondary PDP context activation procedure. That is, the TFT can be generated in addition to the PDP context generated in the PDP context activation procedure via a PDP context modification procedure initiated by the mobile station 111, or can be modified through a PDP context modification procedure initiated by the mobile station 111. One PDP context cannot have two or more TFTs.

Referring now to FIG. 3, the TFT has a TFT type field (Traffic Flow Template Type), a TFT type length field illustrated as "Length of Traffic Flow Template Type", a TFT operation code field illustrated as "TFT operation code", a packet filter field illustrated as "number of packet filters", and a packet filter list field illustrated as "Packet filter List". The TFT type field, a field indicating the type of TFT used, is preferably set to a value of 137 in the UMTS core network 200. In an embodiment of the invention, the TFT type field can be set to different values based on the network. The TFT type length field, a field indicating a length of the TFT type used, has a prescribed length, for example, a 2-byte field and represents a size of a remaining field excluding the TFT type field and the TFT type length field. The TFT operation code field, a field representing an operation code for the TFT used, analyzes a value represented by the TFT operation code field and determines a method in which the TFT received from the mobile station 111 is to be processed. Codes used in the TTF operation illustrated in Table 1.

TABLE 1

| Bits (765) | Description |
|---|---|
| 000 | Spare |
| 001 | New TFT is generated |
| 010 | Stored TFT is deleted |
| 011 | Packet filter is added to stored TFT |
| 100 | Packet filter of stored TFT is replaced |
| 101 | Packet filter of stored TFT is deleted |
| 110 | Reserved |
| 111 | Reserved |

As illustrated in Table 1, a TFT operation code "000" represents a spare value, a TFT operation code "001" represents an operation of generating a new TFT, a TFT operation code "010" represents an operation of deleting a stored TFT, a TFT operation code "011" represents an operation of adding a packet filter to a stored TFT, a TFT operation code "100" represents an operation of replacing a packet filter of a stored TFT, a TFT operation code field "101" represents an operation of deleting a packet filter of a stored TFT, and TFT operation codes "110" and "111" represent reversed fields. The GGSN 119 reads the TFT operation code field and performs a corresponding operation.

The packet filter number field, a field representing the number of packet filters which is set in the TFT used, represents the number of packet filters existing in a packet filter list of the TFT. For example, if the TFT operation code field has a value "101," i.e., if a stored TFT is deleted, a value of the packet filter number field is set to 0. Therefore, if the stored TFT is deleted, a value of the other packet filter number field is set to a value being larger than 0 and smaller than or equal to 8 (0<number of packet filters≦8). A value of the packet filter number field is set to a value larger than 0 and smaller than or equal to 8 because the maximum number of packet filters used in the UMTS core network 200 is set to 8. The TFT information can have a minimum of 1 packet filter and a maximum of up to 8 packet filters. The packet filter is divided into a single-field packet filter with a single content and a multi-field packet filter with multiple contents. The single-field packet filter is comprised of a single content filtered by a packet filter, e.g., a single content such as a source address. The multi-field packet filter is comprised of multiple contents filtered by a packet filter, e.g., multiple contents such as a source address, a protocol and a destination address. The packet filter list field is a field representing the contents for information used by the packet filters set in the TFT.

If the TFT having the format of FIG. 3 is stored in the GGSN 119 and IP packet data from the Internet 121 is received, the received IP packet data is filtered via packet filters stored in the stored TFT. The filtered IP packet data uses a PDP context where a corresponding TFT is stored. Therefore, in the case where there exists 3 packet filters labeled first to third packet filtersamong a plurality of packet filters in the TFT, if the received IP packet data does not satisfy the first packet filter among the 3 packet filters, then a second packet filter, which is the next packet filter stored in the TFT, is applied. In this manner, if all the packet filters are not satisfied, the received IP packet data uses another GTP tunnel, and attempts packet filtering using the next TFT instead of the packet filtering-completed TFT.

A GTP tunnel generation procedure based on primary PDP context activation will be described with reference to FIG. 4.

FIG. 4 is a signal flow diagram illustrating an example of a GTP tunnel generation operation based on primary PDP context activation. In order to transmit packet data in a UMTS packet domain, it is necessary to first generate a GTP tunnel for transmitting the packet data. A path through which the GTP tunnel is generated is divided into an MS-initiated activation path where a GTP tunnel generation request is transmitted from the mobile station 111 to the UMTS core network and a network-requested activation path where a GTP tunnel generation request is transmitted from an external network to the UMTS core network.

Referring to FIG. 4, upon detecting generation of packet data, the mobile station (MS) 111 generates a GTP tunnel in order to transmit the packet data. Specifically, the mobile station 111 transmits an Activate PDP Context Request message to the SGSN 115 in step 411. Parameters included in the Activate PDP Context Request message include Network layer Service Access Point Identifier (NSAPI), TI, PDP Type, PDP Address, Access Point Network, and Quality of Service (QoS).

The NSAPI, information generated in the mobile station 111, can use a total of 11 values ranging from #5 to #15. The NSAPI value is associated with the PDP Address and a PDP context ID on a one-to-one basis. The PDP Address, represents an IP address of the mobile station 111 used in the UMTS packet domain, and is information constituting the PDP context information. The PDP context stores various information concerning the GTP tunnel. The PDP context is managed by the PDP context ID. The TI is used in the mobile station 111, the UTRAN 113 and the SGSN 115, and is uniquely assigned to GTP tunnels in order to identify the GTP tunnels. Although the TI and the NSAPI are similar to each other in their concept, they are different from each other in that the TI is used in the mobile station 111, the UTRAN 113 and the SGSN 115, and the NSAPI is used in the mobile station 111, the SGSN 115 and the GGSN 119. The PDP Type represents a type of GTP tunnel that is generated via the Activate PDP Context Request message. The type of GTP tunnel includes Internet Protocol (IP), Point to Point Protocol (PPP), and Mobile IP. The Access Point Network represents an access point of a service network that the GTP tunnel generation-requesting mobile station 111 currently desires to access. The QoS represents the quality of the packet data transmitted through the currently generated GTP tunnel. That is, packet data using a GTP tunnel with high QoS is processed earlier than the packet data using a GTP tunnel with low QoS.

Referring to FIG. 4, upon receiving the Activate PDP Context Request message, the SGSN 115 transmits a Radio Access Bearer Setup message to the UTRAN 113 thereby establishing a radio access bearer to the UTRAN 113 in step 413. The UTRAN 113 then transmits a Radio Access Bearer Setup message to the mobile station 111 to set up a radio access bearer to the mobile station 111 in step 413. The radio access bearer is set up between the SGSN 115 and the UTRAN 113 and between the UTRAN 113 and the mobile station 111. If a trace function is activated in the UTRAN 113, the SGSN 115 transmits the Invoke Trace message to the UTRAN 113 along with trace information acquired from a home location register (not shown) or an operation and maintenance center (OMC) in step 415. The trace function is used to trace a flow of data.

When a radio access bearer is set up to the UTRAN 113, the SGSN 115 transmits a Create PDP Context Request message to the GGSN 119 in step 417. A tunnel endpoint ID (TEID) is set up between the SGSN 115 and the GGSN 119. The tunnel endpoint ID is set up to transmit packet data between network nodes using the GTP tunnel. That is, the SGSN 115 stores a tunnel endpoint ID of the GGSN 119, and the GGSN 119 stores a tunnel endpoint ID of the SGSN 115. Therefore, the Create PDP Context Request message includes a tunnel endpoint ID that should be used when the GGSN 119 transmits packet data to the SGSN 115.

Upon receiving the Create PDP Context Request message, the GGSN 119 transmits a Create PDP Context Response message to the SGSN 115 in step 419 if PDP context creation is completed in response to the Create PDP Context Request message. Generation of a GTP tunnel between the SGSN 115 and the GGSN 119 is completed, enabling packet data transmission. Upon receiving the Create PDP Context Response message, the SGSN 115 transmits an Activate PDP Context Accept message to the mobile station 111 in step 421. As the mobile station 111 receives the Activate PDP Context Accept message, a radio channel is generated between the mobile station 111 and the UTRAN 113. As a result, generation of a GTP tunnel among the UTRAN 113, the SGSN 115 and the GGSN 119 is completed. That is, the mobile station 111 can transmit and receive all packet data transmitted over its PDP address. A GTP tunnel generated in the PDP context procedure is associated with a PDP context on a one-to-one basis. If the GTP tunnel changes, the PDP context also changes. Therefore, different tunnel information is provided.

A general GTP tunnel generation procedure based on PDP context activation, i.e., a primary PDP context activation procedure, has been described With reference to FIG. 4. A GTP tunnel generation procedure based on secondary PDP context activation will now be described with reference to FIG. 5.

FIG. 5 is a signal flow diagram illustrating an example of a conventional GTP tunnel generation procedure based on secondary PDP context activation. The secondary PDP context activation procedure is defined as a procedure for newly generating a GTP tunnel by reusing the intact GTP tunnel information of the previously activated primary PDP context. That is, the GTP tunnel generated according to the secondary PDP context activation procedure is called a secondary GTP tunnel as stated above. The secondary GTP tunnel uses the intact primary PDP context information.

Referring to FIG. 5, the mobile station 111 transmits an Activate Secondary PDP Context Request message to the SGSN 115 to generate a secondary GTP tunnel in step 511. Parameters included in the Activation Secondary PDP Context Request message include NSAPI, Linked TI, PDP Type, PDP Address, Access Point Network and QoS. Unlike the Activate PDP Context Request message, the Activate Secondary PDP Context Request message includes a Linked TI. and provides the intact information on the previously activated primary PDP context, i.e., the intact primary GTP tunnel information. As described in conjunction with FIG. 4, since TI is used to identify a GTP tunnel among the mobile station 111, the UTRAN 113 and the SGSN 115, the Linked TI is used to provide the same information as the primary GTP tunnel.

Upon receiving the Activate Secondary PDP Context Request message, the SGSN 115 transmits a Radio Access Bearer Setup message to the UTRAN 113 in order to set up a radio access bearer to the UTRAN 113 in step 513. The UTRAN 113 then transmits a Radio Access Bearer Setup message to the mobile station 111 to set up a radio access bearer to the mobile station 111 in step 515. A radio access bearer is set up between the SGSN 115 and the UTRAN 113 and between the UTRAN 113 and the mobile station 111.

When a radio access bearer is set up to the UTRAN 113, the SGSN 115 transmits a Create PDP Context Request message to the GGSN 119 in step 517. The SGSN 115 transmits a primary NSAPI to indicate that the GTP tunnel to be generated is a secondary GTP tunnel. The primary NSAPI value is associated with information on the previously activated primary PDP context on a one-to-one basis. It is possible to use the primary PDP context information by consulting the primary NSAPI value. Further, the SGSN 115 transmits the Create PDP Context Request message using TFT information. To distinguish the primary GTP tunnel from the secondary GTP tunnel. That is, if TFT is not stored in the primary GTP tunnel, TFT is stored only in the secondary GTP tunnels. As described in conjunction with the primary GTP tunnel generation, a tunnel endpoint ID is newly set up between the SGSN 115 and the GGSN 119, and the tunnel endpoint ID is set up to transmit packet data between network nodes using the GTP tunnel. That is, the SGSN 115 stores a tunnel endpoint ID of the GGSN 119, and the GGSN 119 stores a tunnel endpoint ID of the SGSN 115. Therefore, the Create PDP Context Request message includes a tunnel endpoint ID that should be used when the GGSN 119 transmits packet data to the SGSN 115.

Upon receiving the Create PDP Context Request message, the GGSN 119 transmits a Create PDP Context Response message to the SGSN 115 in step 519 if PDP context creation is completed in response to the Create PDP Context Request message. Generation of a secondary GTP tunnel between the SGSN 115 and the GGSN 119 is completed, enabling packet data transmission. Upon receiving the Create PDP Context Response message, the SGSN 115 transmits an Activate PDP Context Accept message to the mobile station 111 (Step 521). As the mobile station 111 receives the Activate PDP Context Accept message, a radio channel is generated between the mobile station 111 and the UTRAN 113. As a result, generation of a secondary GTP tunnel among the UTRAN 113, the SGSN 115 and the GGSN 119 is completed. That is, the mobile station 111 can transmit and receive all packet data transmitted over its PDP address. A secondary GTP tunnel generated in the PDP context procedure is also associated with a PDP context on a one-to-one basis.

FIG. 6 is a diagram illustrating an example of a TFT information format for generation of a new TFT. If a TFT operation code of a TFT illustrated in FIG. 3 is set to "001," a new TFT is generated. A "0" field as illustrated in FIG. 6, is a spare bit, and is a non-assigned field, the use of which is not determined yet, and is generally set to "0." In FIG. 6, a packet filter list field is subdivided. Referring to FIG. 6, a packet filter identifier (ID) is used to identify a corresponding packet filter among a plurality of packet filters set in the TFT. As stated above, since it is assumed that the maximum number of packet filters that can be set in the TFT is 8 by way of example, the maximum number of packet filter IDs is also set to 8. In FIG. 6, the packet filter ID is expressed with $0^{th}$ to $2^{nd}$ bits, and the remaining $4^{th}$ to $7^{th}$ bits are set as spare bits.

Packet filter evaluation precedence represents an order applied to all packet filters set in the TFT. That is, the packet filter evaluation precedence represents an order in which the packet filters are to be applied to packet data received from an external network. As the packet filter evaluation precedence value is small, the order applied to the packet data received from the external network becomes smaller. If packet data is received from the external network, the TFT packet filters stored in the GGSN 119 are applied to the received packet data beginning at a packet filter with the smallest packet filter evaluation precedence value. If a header of the received packet data is not matched, a packet filter with the smallest packet filter evaluation precedence value applies the received packet data to a packet filter with a second smallest packet filter evaluation precedence value. In addition, a packet filer contents length field (length of packet filter contents) represents a length of corresponding packet filter's contents.

Finally, a packet filter content field includes a packet filter component type ID, and has a variable length. A length of the packet filter contents is variable because the packet filters have different lengths and the number of packet filters set in the TFT is variable according to circumstances. The packet filter component type ID, once it is used, cannot be used for any packet filter. It is not possible to form a packet filter by using an IPv4 source address type together with an IPv6 source address type in the same TFT. Further, it is not possible to form the packet filter by using a single destination port type together with a destination port range type. In addition, it is not possible to form the packet filter by using a single source port type together with a source port range type. The packet filter component types and their associated packet filter component type IDs are illustrated in Table 2.

TABLE 2

| Bits (76543210) | Description |
| --- | --- |
| 0001 0000 | IPv4 source address type |
| 0010 0000 | IPv6 source address type |
| 0011 0000 | Protocol identifier/Next header type |
| 0100 0000 | Single destination port type |
| 0100 0001 | Destination port range type |
| 0101 0000 | Single source port type |
| 0101 0001 | Source port range type |
| 0110 0000 | Security parameter index type |
| 0111 0000 | Type of service/Traffic class type |
| 1000 0000 | Flow label type |
| All other values | Reserved |

As illustrated in Table 2, a plurality of packet filter components can be formed in one packet filter. For example, a terminal equipment (TE) can classify TCP/IPv4 packet data transmitted to a TCP port 5003 at 172.168.8.0/24, and a packet filter can be formed as defined below.

packet filter identifier=1;
IPv4 Source Address=172.168.8.0;
Protocol Number for TCP=6;
Destination Port=5003;

Classifying packet data in this manner using a plurality of parameters is called multi-field classification, and the packet filter component types will be described below.

First, an TPv4 source address type will be described. Packet filter contents set in the IPv4 source address type comprise an IPv4 address field having a 4-octet size and an IPv4 address mask field having a 4-octet size. The IPv4 address field is transmitted earlier than the IPv4 address mask. The IPv4 address field cannot be set in the TFT that is transmitted as the Activate Secondary PDP Context Request message used to access a service network of an access point network (APN).

That is, the mobile station 111 receives an actual IP address via a domain name service (DNS) server for a service network that the mobile station 111 first accesses while initially activating a secondary PDP context. In this case, since the mobile station 111 has already been waiting to transmit the Activate Secondary PDP Context Request message, it is impossible to modify packet filter contents of the set TFT. After the initial access, since the mobile station 111 recognizes an IP address of a corresponding service received from the DNS server, it is possible to use the IPv4 source address type as contents of the set TFT packet filter. When the mobile station 111 transmits the Activate Secondary PDP Context Request message to communicate with another mobile station instead of initially accessing a new service network, it is not possible to use the IPv4 source address type for the TFT as packet filter contents.

An IPv6 source address type will now be described. The IPv6 source address type comprises a 16-octet IPv6 address field and a 16-octet IPv6 address mask field. The IPv6 address field is transmitted earlier than the IPv6 address mask field.

An protocol ID/Next header type will now be described. The protocol ID/Next header type comprises a 1-octet protocol ID, e.g., IPv4, or a Next header type, e.g., IPv6. A single destination port type comprises a 2-octet destination port number. The Single destination port type can be either a UDP port value or a TCP port value according to a protocol field value of an IIP header. A destination port range type comprises a minimum value of a 2-octet destination port number and a maximum value of the 2-octet destination port number. The destination port range type can be a range of either a UDP port or a TCP port according to a protocol field value of an IP header.

A single source port type comprises a 2-octet source port number, and can be either a UDP port value or a TCP port value according to a protocol field value of an IP header. A source port range type comprises a minimum value of a 2-octet source port number and a maximum value of the 2-octet source port number, and can range from either a UDP port or TCP port according to a protocol field value of an IP header. A security parameter index type comprises a 4-octet IP security parameter index (SPI). A type of service/traffic class type comprises 1-octet Type of service (IPv4)/Traffic class (IPv6), and 1-octet Type of service mask (IPv4)/Traffic class mask (IPv6). A flow label type comprises a 3-octet IPv6 flow label, and 4th to 7th bits of a first octet constitute a spare field, and an IPv6 flow label is included in the remaining 20 bits.

Up to now, a procedure for generation a new TFT for a TFT operation code "001" has been described with reference to FIG. 6. With reference to FIG. 7, a description will be provide for deleting a stored TFT for a TFT operation code "010," adding a packet filter to a stored TFT for a TFT operation code "011," and replacing a packet filter of a stored TFT for a TFT operation code "100."

FIG. 7 is a diagram illustrating a TFT information format for deleting a stored TFT, adding a packet filter to the stored TFT or replacing a packet filter of the stored TFT.

In the case of deleting a TFT, a TFT operation code is checked regardless of a packet filter list field. Thereafter, if the TFT operation code value is a prescribed value representing TFT deletion, i.e., "010," then the same TFT as the TFT type to be deleted among the TFTs stored in the GGSN 119 is deleted from the GGSN 119. In the case of adding a packet filter to the stored TFT, the same information deleting a TFT is used, and contents of a corresponding packet filter list is added to the stored TFT. In the case of replacing a packet filter of the stored TFT, the same information of deleting a TFT and the case of adding a packet filter to the stored TFT is used, and the contents of a corresponding packet filter is deleted and then replaced.

Hitherto, a procedure for deleting a stored TFT for a TFT operation code "010," a procedure for adding a packet filter to a stored TFT for a TFT operation code "011," and a procedure for replacing a packet filter of a stored TFT for a TFT operation code "100" has been described with reference to FIG. 7. A procedure for deleting a packet filter of a stored TFT for a TFT operation code "101" will now be described with reference to FIG. 8.

FIG. 8 is a diagram illustrating a TFT information format for deleting a packet filter of a stored TFT. As illustrated in FIG. 8, when deleting a packet filter from a stored TFT, consideration is taken into of only a packet filter ID regardless of a packet filter list. The GGSN 119 deletes, from packet filters of the stored TFT, a packet filter corresponding to a packet filter ID of the TFT information provided from the mobile station 111. FIG. 8 shows a case of deleting, from a stored TFT, N packet filters of first to N$^{th}$ packet filters.

Referring to FIG. 9 which is a block diagram illustrating a TFT packet filtering procedure in a general UMTS core network. For the convenience of explanation, FIG. 9 will be described based on the assumption that each TFT has a single packet filter. The GGSN 119 of the UMTS core network 200 has a total of 4 TFTs stored therein. Each of the 4 TFTs has one packet filter. That the GGSN 119 has the 4 TFTs stored therein means that the GGSN 119 includes one primary GTP tunnel for the SGSN 115 and 5 GTP tunnels, i.e., a primary PCP context, and 4 secondary GTP tunnels for secondary PDP contexts, and the 5 GTP tunnels share the same PDP context. The 5 GTP tunnels are identified by only the TFT.

If packet data received from an external network, e.g., the Internet 121, fails to undergo packet filtering through the 4 TFTs, the packet data is transmitted to the SGSN 115 through only a primary PDP context or a primary GTP tunnel. For example, if it is assumed that the packet data received from the Internet 121 has Type of Service (TOS) of 0x30, a protocol of TCP, a source address of 1.1.1.1, a destination address of 2.2.2.2, a source port of 200 and a destination port of 50, then the received packet data does not undergo packet filtering at up to TFT1 and TFT2 since it is not coincident with packet filter contents, and undergoes packet filtering at TFT3 since it is coincident with packet filter contents of TFT3. The received packet data is transmitted to the SGSN 115 through a GTP tunnel corresponding to the coincident TFT3. The packet data received from the Internet 121 fails to undergo packet filtering at TFT1 and TFT2 because as a source address, the TFT1 packet filter contents, is 3.3.3.3, it is not coincident with a source address "1.1.1.1" of the received packet data, and as a protocol, the TFT2 packet filter contents, is ICMP, it is not coincident with a protocol TCP of the received packet data. Further, the reason why the received packet data is filtered at the TFT3 is because TOS, the TFT3 packet filter contents, is 0×30. It is coincident with TOS "0×30" of the received packet data.

As described above, a TFT is generated usually in association with a PDP context (GTP tunnel) in the secondary PDP context activation procedure. The TFT can be added, modified or deleted via an MS-initiated PDP context modification procedure where the mobile station 111 modifies a PDP context generated in a PDP context activation procedure. Also as stated above, one PDP context can have only one TFT. In the case where the mobile station 111 intends to generate a new TFT or modify a TFT stored in the GGSN 119, the TFT should preferably store at least one valid packet filter. If there exists no valid packet filter in the stored FTF, the MS-initiated PDP context modification procedure fails, and the GGSN 119 transmits an error code representing failure of the MS-initiated PDP context modification procedure for the TFT to the mobile station 111. The TFT is deleted, if a PDP context associated with the TFT is inactivated.

As described above, however, the packet data received at the GGSN 119 from the external network undergoes packet filtering through a TFT stored in the GGSN 119, and the packet filtering through the TFT is sequentially performed beginning at a packet filter with the smallest packet filter evaluation precedence for at least one packet filter stored in the TFT. For example, if 5 TFTs are stored in the GGSN 119 and each of the 5 TFTs stores 4 packet filters, packet data received from an external network, i.e., the Internet 121, undergoes packet filtering for the 4 packet filters beginning at the first TFT among the 5 TFTs. If the packet filtering fails, the packet data received from the external network undergoes packet filtering by the second TFT. Therefore, as compared with the case where the TFT is not used for the packet data received from the external network 121, a UMTS core network performance loss can occur due to the packet filtering. If TFTs stored in the GGSN 119 abruptly increase in number and the packet data received from the external network 121 abruptly increases in amount, a performance loss due to the packet filtering can fatally affect the UMTS core network.

SUMMARY OF THE INVENTION

It is, therefore, an object of the present invention to provide an apparatus and method for reordering traffic flow templates (TFTs) in a mobile communication system.

It is another object of the present invention to provide an apparatus and method for reordering traffic flow templates according to the frequency of packet data successfully TFT packet filtered in a mobile communication system.

It is another object of the present invention to provide a TFT reordering apparatus and method for providing minimum packet filtering calculations for input packet data in a mobile communication system.

To substantially accomplish the above and other objects, the present invention provides an apparatus and method for reordering traffic flow templates (TFTs) in a mobile communication system including a primary General Packet Radio Service (GPRS) tunneling protocol (GTP) tunnel for transmitting and receiving packet data to and from a mobile station and one or more secondary GTP tunnels having the same mobile station address as the primary GTP tunnel and each being divided into different TFTs, the TFTs each including different packet filter contents so that the secondary GTP tunnels are separated through TFT packet filtering. The apparatus and method comprise a controller adapted to sequentially perform TFT packet filtering on input packet data for the TFTs, manage statistical data of packet data successfully TFT packet filtered according to the TFTs, and reorder an order of the TFTs by comparing the statistical data of the packet data successfully TFT packet filtered for the TFTs if a preset period expires; and a memory adapted to store packet filter contents for each of the TFTs, and store statistical data for packet data successfully TFT packet filtered for each of the TFTs.

The above and other objects are substantially accomplished by an apparatus and method for reordering traffic flow templates (TFTs) in a mobile communication system including a primary GPRS (General Packet Radio Service) tunneling protocol (GTP) tunnel for transmitting and receiving packet data to/from a mobile station and one or more secondary GTP tunnels having the same mobile station address as the primary GTP tunnel and each being divided into different TFTs, the TFTs each including different packet filter contents so that the secondary GTP tunnels are separated through TFT packet filtering. The apparatus and method perform the operations of sequentially performing TFT packet filtering on input packet data for the TFTs, managing statistical data of packet data successfully TFT packet filtered according to the TFTs; comparing statistical data of the packet data successfully TFT packet filtering for each of the TFTs, if a preset period expires; and reordering an order of the TFTs based on the comparison result of the statistical data.

BRIEF DESCRIPTION OF THE DRAWINGS

The above and other objects, features and advantages of the present invention will become more apparent from the following detailed description when taken in conjunction with the accompanying drawings in which:

FIG. 6 is a diagram illustrating a TFT information format for generation of a new TFT, adding a packet filter to the stored TFT or replacing a packet filter of the stored TFT;

FIG. 7 is a diagram illustrating an example of a TFT information format for deleting a stored TFT;

FIG. 8 is a diagram illustrating an example of a TFT information format for deleting a packet filter of a stored TFT;

FIG. 16 is a table illustrating a an example of a comparison between an amount of calculations for TFT packet filtering of FIG. 14 and an amount of calculations for TFT packet filtering of FIG. 15 in accordance with an embodiment of the present invention;

FIG. 17 is a table illustrating an example of TFT packet filtering calculations by a primary TFT reordering procedure in the case where an amount of TFT packet filterings on packet data for each of a plurality of TFTs is the same in accordance with an embodiment of the present invention;

FIG. 18 is a table illustrating an example of TFT packet filtering calculations by a primary TFT reordering procedure when an amount of TFT packet filterings on packet data for a specified one of a plurality of TFTs is large in accordance with an embodiment of the present invention;

FIG. 19 is a table illustrating an example of TFT packet filtering calculations by a primary TFT reordering procedure when an amount of TFT packet filterings on packet data for a specified one of a plurality of TFTs is small in accordance with an embodiment of the present invention;

FIG. 20 is a table illustrating an example of TFT packet filtering calculations by a primary TFT reordering procedure in the case where each of a plurality of TFTs has a large difference in an amount of TFT packet filterings on packet data for a neighboring TFT in accordance with an embodiment of the present invention;

FIG. 23 is a table illustrating an example of a comparison between an amount of calculations for TFT packet filtering of FIG. 14 and an amount of calculations for TFT packet filtering of FIG. 22 in accordance with an embodiment of the present invention;

FIG. 24 is a table illustrating an example of TFT packet filtering calculations by a secondary TFT reordering procedure in the case where an amount of TFT packet filterings on packet data for each of a plurality of TFTs is the same in accordance with an embodiment of the present invention;

FIG. 25 is a table illustrating an example of TFT packet filtering calculations by a secondary TFT reordering procedure when an amount of TFT packet filterings on packet data for a specified one of a plurality of TFTs is large in accordance with an embodiment of the present invention;

FIG. 26 is a table illustrating an example of TFT packet filtering calculations by a secondary TFT reordering procedure when an amount of TFT packet filterings on packet data for a specified one of a plurality of TFTs is small in accordance with an embodiment of the present invention; and FIG. 27 is a table illustrating an example of TFT packet filtering calculations by a secondary TFT reordering procedure when each of a plurality of TFTs has a large difference in an amount of TFT packet filterings on packet data for a neighboring TFT in accordance with an embodiment of the present invention.

DETAILED DESCRIPTION OF THE PREFERRED EMBODIMENT

Several embodiments of the present invention will be described herein below with reference to the accompanying drawings. In the following description, well-known functions or constructions have been omitted for conciseness.

Figure 10:
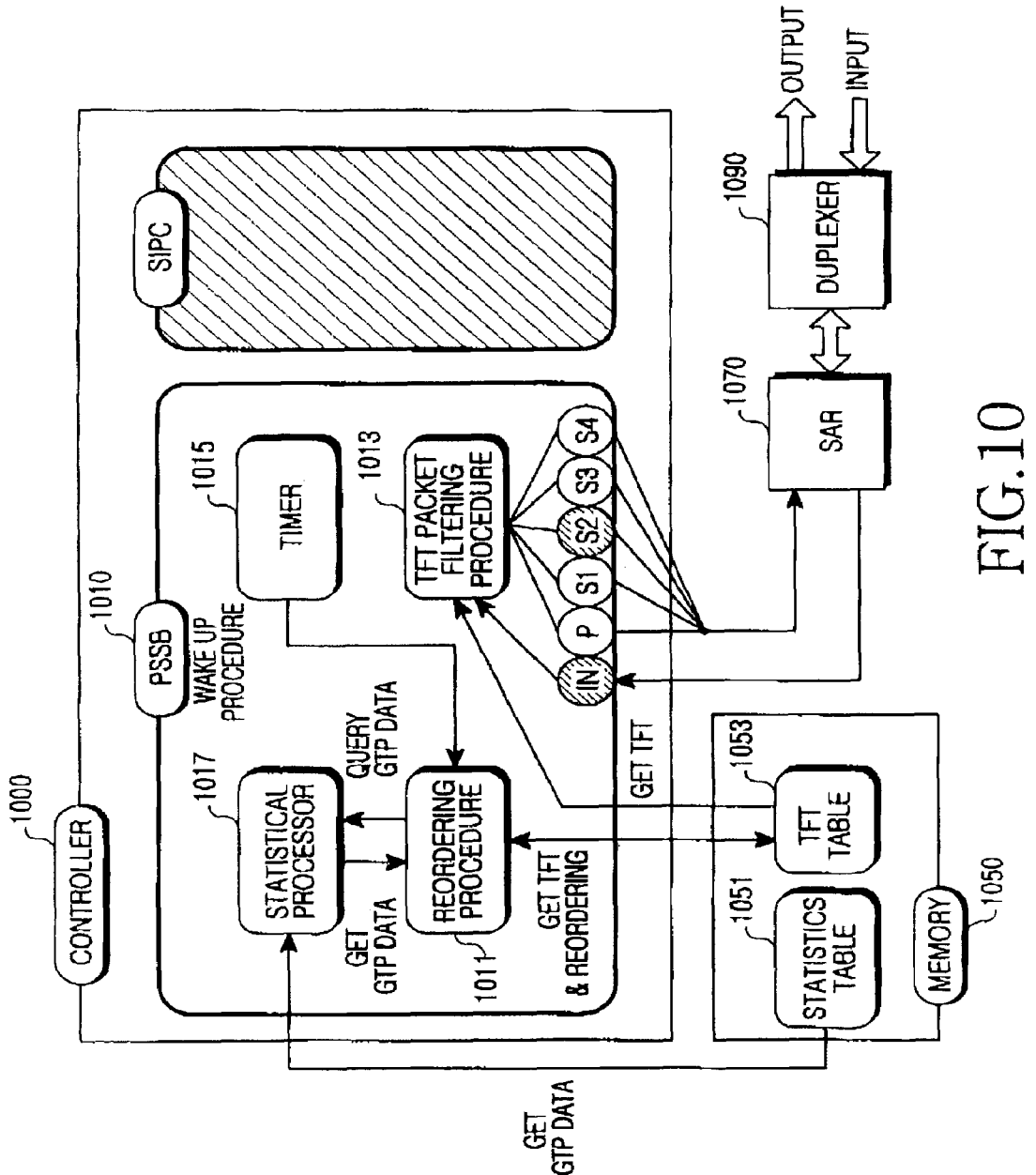
FIG. 10 is a block diagram illustrating an example of an internal structure of a traffic flow template (TFT) reordering apparatus in accordance with an embodiment of the present invention.

FIG. 10 is a block diagram illustrating an example of an internal structure of a traffic flow template (TFT) reordering apparatus in accordance with an embodiment of the present invention.

Figure 1:
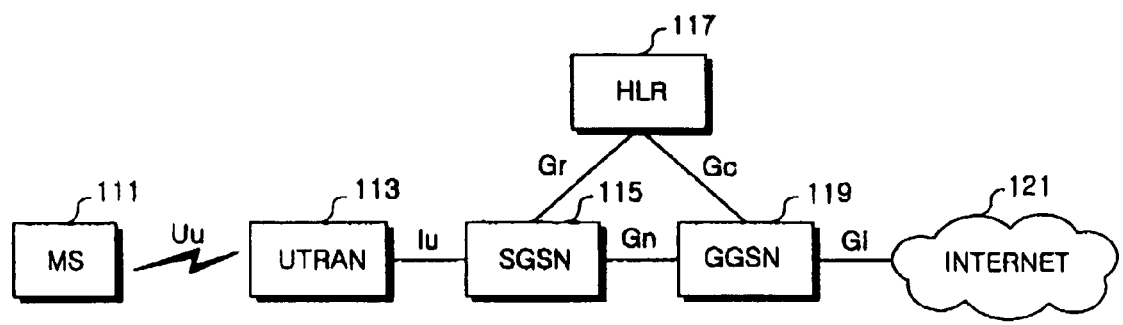
FIG. 1 is a block diagram illustrating an example of a general UMTS network structure.
Figure 2:
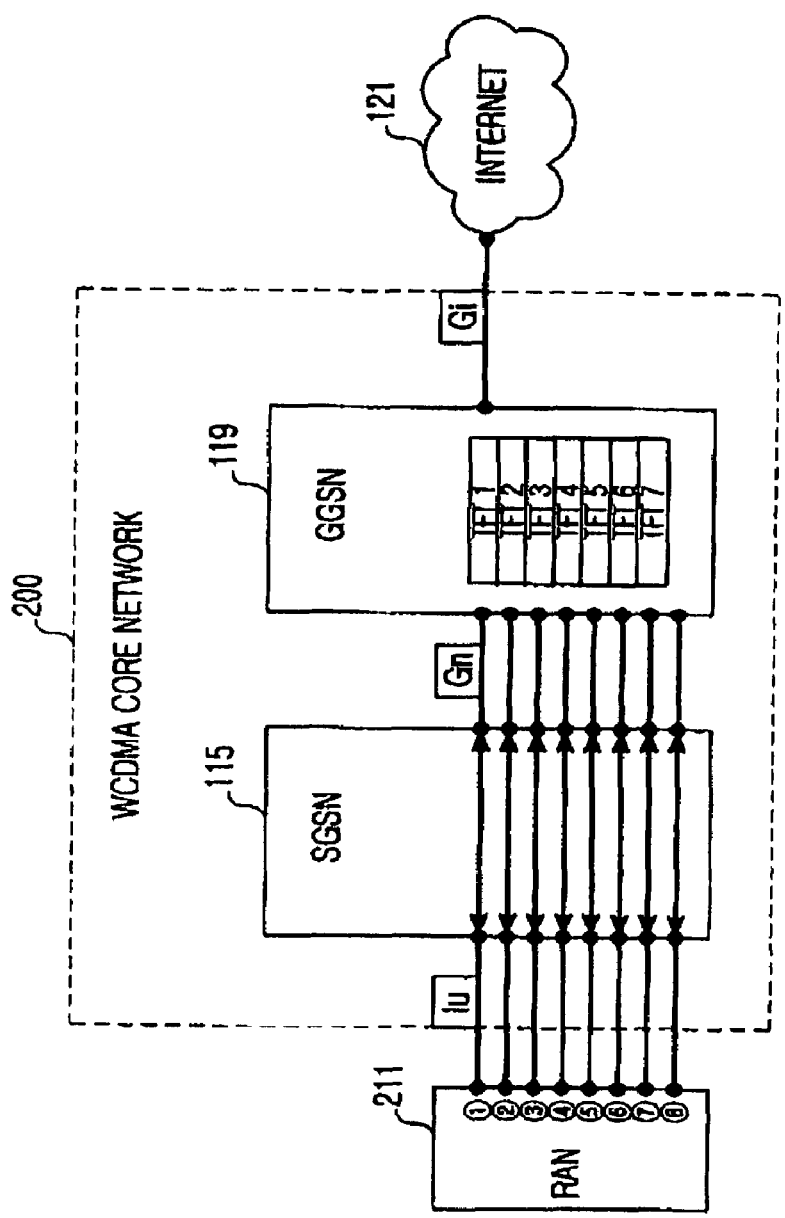
FIG. 2 is a block diagram illustrating an example of a general UMTS core network using TFTs.
Figure 3:
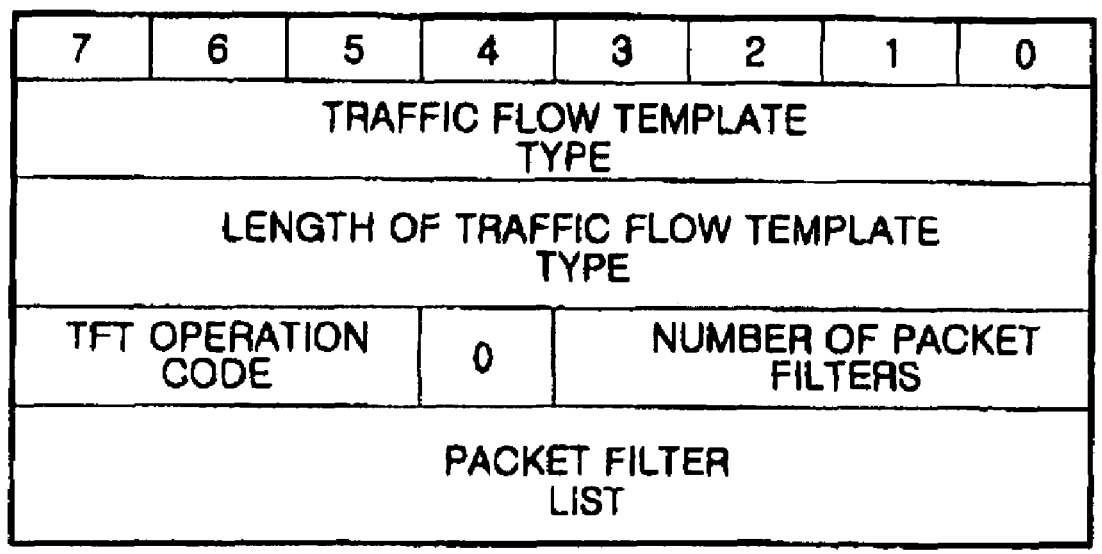
FIG. 3 is a diagram illustrating a general TFT format.
Figure 4:
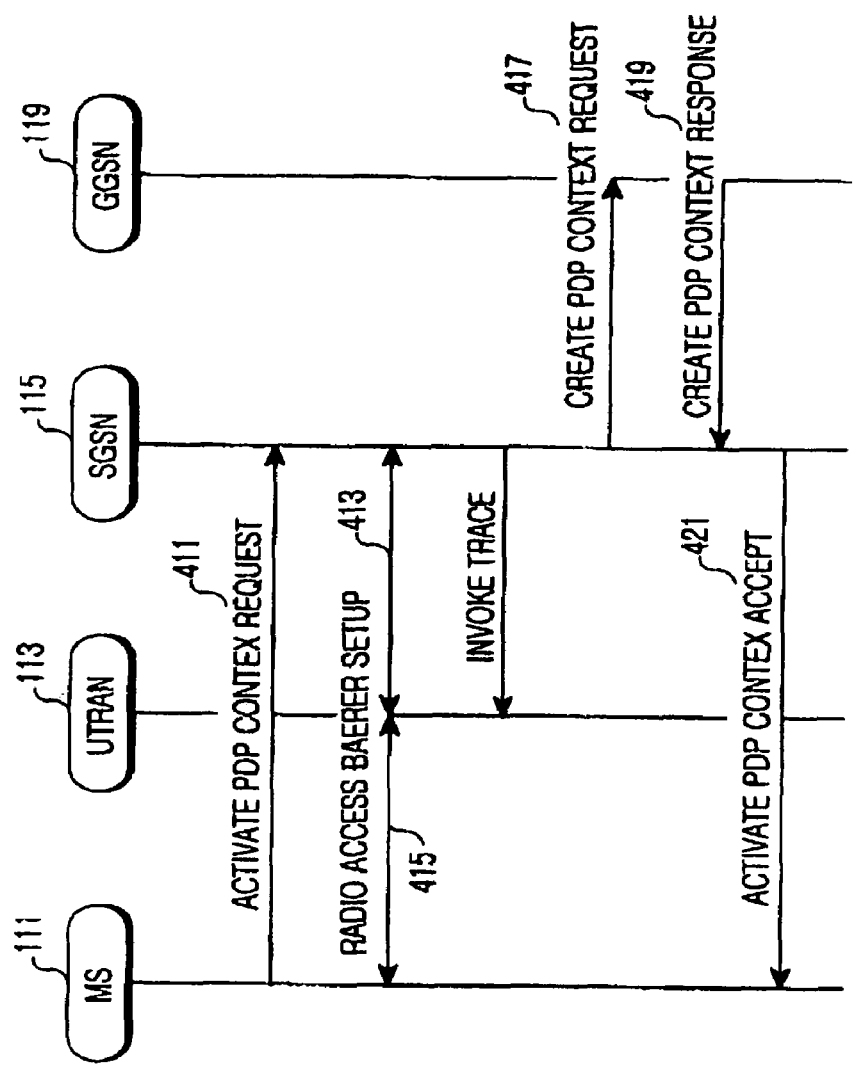
FIG. 4 is a signal flow diagram illustrating an example of a GTP tunnel generation procedure based on a primary PDP context activation.
Figure 5:
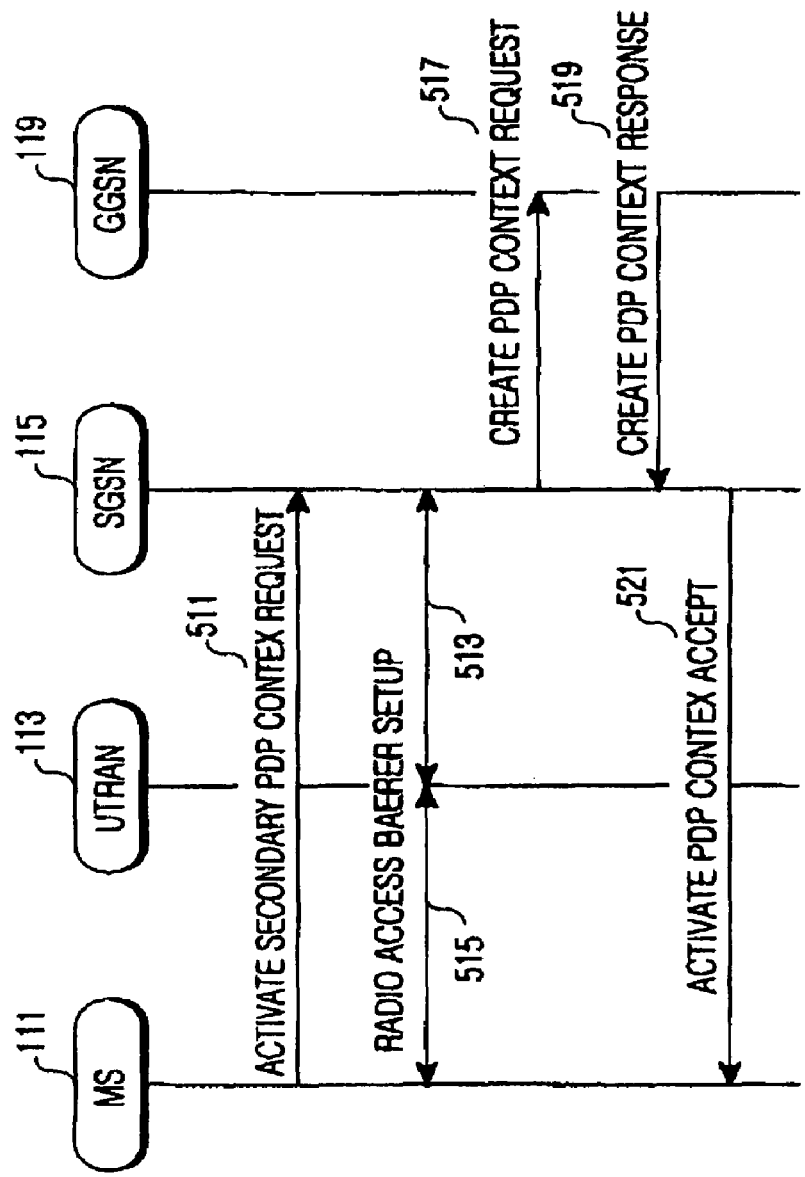
FIG. 5 is a signal flow diagram illustrating an example of a GTP tunnel generation procedure based on a secondary PDP context activation.

It should be noted that a universal mobile telecommunications system (UMTS) network and a core network (CN), to which the invention is applied, have the same structure as described in conjunction with FIGS. 1 and 2, except for a TFT packet filtering part. Further, it should be noted that a primary Packet Data Protocol (PDP) context activation procedure and a secondary PDP context activation procedure are performed in the same way as described in conjunction with FIGS. 4 and 5. Furthermore, like reference numerals designate like parts throughout the figures.

Referring to FIG. 10, the TFT reordering apparatus includes a controller or central processing unit (CPU) 1000, a memory or random access memory (RAM) 1050, a segmentation and reassembly unit (SAR) 1070, and a duplexer 1090. A general packet radio service (GPRS) is a packet data service performed in the UMTS network. The controller 1000 processes packet data received from an external network, e.g., the Internet 121, via a Gi interface of a gateway GPRS support node (GGSN) 119, and performs a generation control operation such as a math operation, scheduling and task management. In accordance with an embodiment of the present invention, the controller 1000 manages a packet service slave block (PSSB) task 1010, and an S_interprocess communications (SIPC) task is hatched, and since the SIPC task is not closely related to an embodiment of the present invention, a detailed description thereof will not be provided herein. The PSSB task 1010 processes various protocols by receiving GTP-u packet data transmitted through a GPRS tunneling protocol (GTP) tunnel or Internet protocol (IP) packet data transmitted from an external network, e.g., the Internet 121.

The PSSB task 1010 includes a reordering procedure 1011, a TFT packet filtering procedure 1013, a timer 1015, and a statistical processor 1017. The reordering procedure 1011, a procedure for controlling reordering on TFTs stored in the GGSN 119, performs a primary TFT reordering procedure and a secondary TFT reordering procedure. The TFT packet filtering procedure 1013 is a procedure for performing packet filtering on the TFTs, and the timer 1015 counts a period for which the TFT reordering procedure 1011 reorders the TFTs stored in the GGSN 119, and at the expiration of the corresponding period, provides the reordering procedure 1011 with a signal indicating expiration of a reordering period. The statistical processor 1017 manages GTP-related statistics stored in the memory 1050.

The memory 1050 includes a statistics table 1051 and a TFT table 1053. The statistics table 1051 stores various statistical data for the packet data applied to the GGSN 119. In an embodiment of the present invention, the statistics processor 1017 of the PSSB task 1010 reads the statistics table 1051 and provides the frequency of packet data used in GTP tunnels as statistical data. The TFT table 1053 stores information on TFTs stored in the GGSN 119. The TFTs are reordered by the reordering procedure 1011. The TFT packet filtering procedure 1013 performs packet filtering on the packet data received from the GGSN 119 by consulting the TFT table 1053.

The segmentation and reassembly unit 1070 reassembles asynchronous transfer mode (ATM) cells received from an external network, and provides the reassembled ATM cells to an IN path in the PSSB task 1010. Further, the segmentation and reassembly unit 1070 segments packet data transmitted from the GGSN 119 to the external network, i.e., packet data transmitted through IN, P and S paths of the PSSB task 1010, by the ATM cell, and provides the segmented packet data to the duplexer 1090. The duplexer 1090 selectively receives packet data from the external network, and transmits packet data output from the GGSN 119 to all physically linked blocks.

Now, with reference to FIG. 10, a description will be provided of the points that should be considered to perform TFT packet filtering on the packet data received at the GGSN 119 from the external network through the Gi interface in accordance with an embodiment of the present invention.

First, secondary PDP context activation should be considered. The TFT is not generated in the primary PDP context activation procedure and is generated only in the secondary PDP context activation procedure.

Secondly, TFT information storage should also be considered. TFT information generated by a mobile station (MS) 111 in accordance with the secondary PDP context activation procedure and then transmitted to the GGSN 119 is stored in the GGSN 119.

Thirdly, the storage of packet statistic data for TFT information should also be considered. Statistical data for TFT packet-filtered packet data is segmented for each of the TFTs stored in the GGSN 119, and then separately managed and stored. The packet statistic data stored according to the TFT is used during TFT reordering.

Fourthly, packet filtering should be considered. Packet data received from the external network should be packet-filtered using the TFTs stored in the GGSN 119 to determine a corresponding GTP tunnel.

Fifthly, a primary TFT reordering procedure and a secondary TFT reordering procedure should also be considered in the reordering procedure 1011. The primary TFT reordering procedure and the secondary TFT reordering procedure perform TFT reordering if a preset time has expired, and if the frequency of using a specific TFT among a plurality of TFTs is higher than a preset frequency, the primary TFT reordering procedure and the secondary TFT reordering procedure will reorder TFTs. In addition, the primary TFT reordering procedure and the secondary TFT reordering procedure reorder TFTs, in the case where a parameter for storing TFT packet statistic data reaches a preset number of packet data or a preset number of data packets, wherein the preset number does not exceed a range of data type.

In addition, the following points should be considered by the TFT reordering apparatus of FIG. 10 in order to perform TFT packet filtering on the received packet data.

First, as stated above, the secondary PDP context activation procedure should be considered. As described in conjunction with FIG. 5, the secondary PDP context activation is initiated as the mobile station 111 transmits an Activate Secondary PDP Context Request message to a serving GPRS support node (SGSN) 115 as described in step 511 and the SGSN 115 transmits a Create PDP Context Request message to the GGSN 119 as described in step 517. As described in conjunction with FIG. 5, TFT information is generated in the mobile station 111, and transmitted to the GGSN 119 along with the Create PDP Context Request message. The GGSN 119 activates a secondary PDP context based on TFT information included in the Create PDP Context Request message to generate a secondary GTP tunnel, and processe packet data received from the external network through the generated secondary GTP tunnel.

Second, TFT information storage should be considered. As described above, TFT information provided from the mobile station 111 is stored in the Gi interface of the GGSN 119, and necessary information out of the TFT information, i.e., information such as the number of packet filters and packet filter contents is stored so the packet data received from the external network can undergo TFT packet filtering. That is, the TFT information is transmitted to the SGSN 115 along with the Activate Secondary PDP Context Request message, and transmitted to the GGSN 119 along with the Create PDP Context Request message, and the GGSN 119 extracts only the necessary TFT information from the received Create PDP Context Request message and stores the extracted TFT information. Now, the TFT information stored in the GGSN 119, i.e., stored in the TFT table 1053 of the memory 1050 in the TFT reordering apparatus will be described with reference to FIG. 11.

Figure 11:
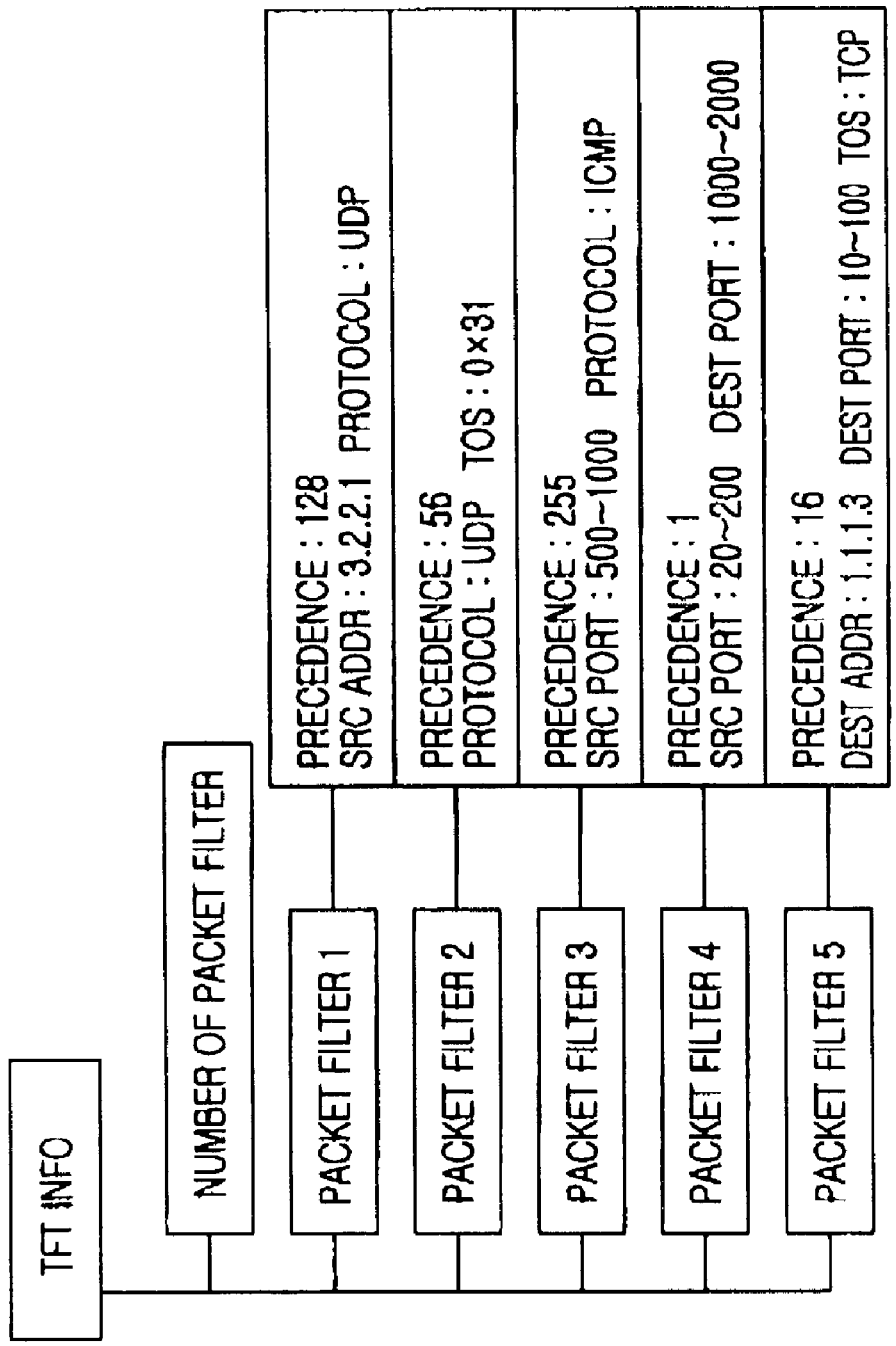
FIG. 11 is a diagram illustrating an example of TFT information stored in the TFT table of FIG. 10 in accordance with an embodiment of the present invention.

FIG. 11 is a diagram illustrating an example of TFT information stored in the TFT table 1053 of FIG. 10 in accordance with an embodiment of the invention. Referring to FIG. 11, the TFT information is divided into a packet filter number "Number of Packet filter" field, a packet filter ID "Packet filter identifier" field, a packet filter evaluation preference field, and a packet filter contents field. The packet filter number field represents the number of packet filters stored in a corresponding TFT, and the packet filter ID field represents a packet filter ID for identifying each of a plurality of packet filters stored in the TFT. The packet filter evaluation preference and the packet filer contents are stored in association with the corresponding packet filter ID. The TFT information stored in FIG. 10 are acquired by separately selecting only the information necessary for TFT reordering from the general TFT information, i.e., TFT information illustrated in FIG. 6.

Third, the storing of packet statistic data for TFT information should be considered. Packet data received from the external network is accumulated in the statistics table 1051 of the memory 1050 in association with a corresponding TFT that was successfully TFT packet filtered. The reordering procedure 1011 performs TFT reordering based on packet statistic data for the TFT information stored in the statistics table 1051. If the TFT reordering is performed by the reordering procedure 1011, the TFT information packet statistic data stored in the statistics table 1051 is initialized.

Fourth, TFT packet filtering should be considered. If packet data is received at the GGSN 119 from the external network, the TFT packet filtering procedure 1013 performs TFT packet filtering on the packet data.

Figure 12:
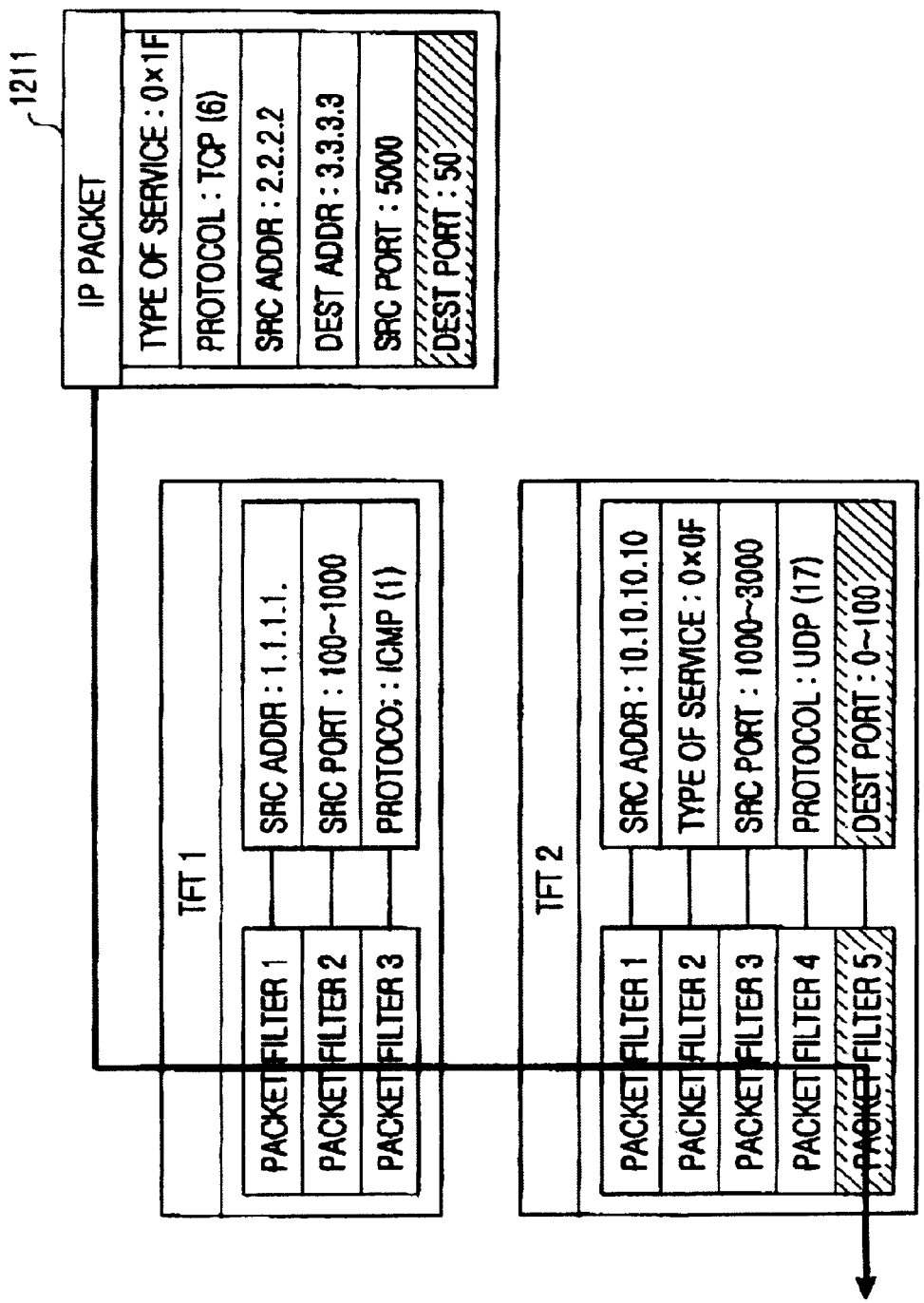
FIG. 12 is a diagram illustrating an example of a packet filtering operation of the TFT packet filtering procedure in FIG. 10 in accordance with an embodiment of the present invention.

FIG. 12 is a diagram illustrating an example of a packet filtering operation of the TFT packet filtering procedure 1013 in FIG. 10 in accordance with an embodiment of the invention. Referring to FIG. 12, if packet data 1211 is received from an external network, i.e., the Internet 121, through the Gi interface of the GGSN 119, i.e., if the packet data 1211 received via the duplexer 1090 is applied to the IN path through the segmentation and reassembly unit 1070, then the TFT packet filter procedure 1013 performs TFT packet filtering based on the TFT information stored in the TFT table 1053 of the memory, 1050. If the TFT information stored in the TFT table 1053 has two TFT information blocks of TFT1 and TFT2 as illustrated in FIG. 12, the TFT packet filtering procedure 1013 attempts TFT packet filtering on the packet data 1211 beginning at a packet filter #1 of the TFT1. Here, the packet data 1211 has TOS (Type Of Service) of 0×1F, a protocol of TCP(6), a source address of 2.2.2.2, a destination address of 3.3.3.3, a source port of 5000, and a destination port of 50.

Figure 9:
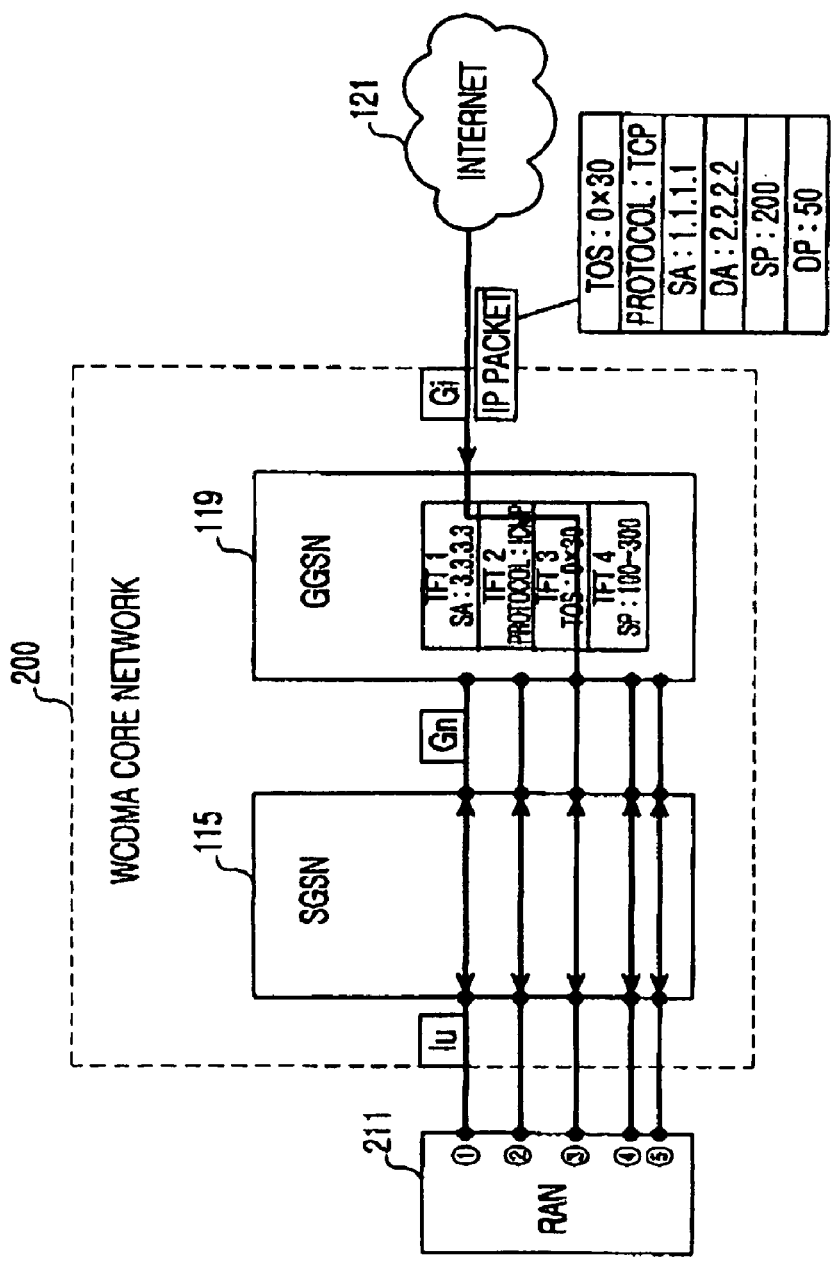
FIG. 9 is a block diagram illustrating an example of a TFT packet filtering procedure in a general UMTS core network.

In the case where the TFT packet filtering procedure 1013 attempts TFT packet filtering on the packet data 1211 at the packet filter #1 of the TFT1, since a source address of the packet filter #1 in the TFT1 is 1.1.1.1, it is not mapped with the source address of the packet data 1211. Therefore, the TFT packet filtering is failed. The TFT packet filtering procedure 1013 then attempts packet filtering on the packet data 1211 at a packet filter #2 of the TFT1. However, since the packet filter #2 of the TFT1 has packet filter contents with a source port range of 100~1000, its source port is not mapped to the source port 5000 of the packet data 1211, causing a failure in TFT packet filtering. In this manner, a TFT packet filter mapped to the received packet data 1211 is searched, and the packet data 1211 is filtered through a TFT packet filter mapped to the packet data 1211, and transmitted to the SGSN 115 through a corresponding GTP tunnel. In FIG. 12, since the destination port of the packet data 1211 is mapped to a destination port range of a packet filter #5 in the TFT2, the packet data 1211 uses a GTP tunnel corresponding to the TFT2. Although a TFT packet filtering procedure for the packet data received from the external network is identical to the method described in conjunction with FIG. 9, the present invention performs packet filtering on only the received packet data corresponding to an initial period in order of initially set TFTs, and reorders TFTs according to frequency of TFT packet-filtered packets from the next period.

Next, a TFT reordering procedure by the reordering procedure 1011 will be described with reference to FIG. 13.

Figure 13:
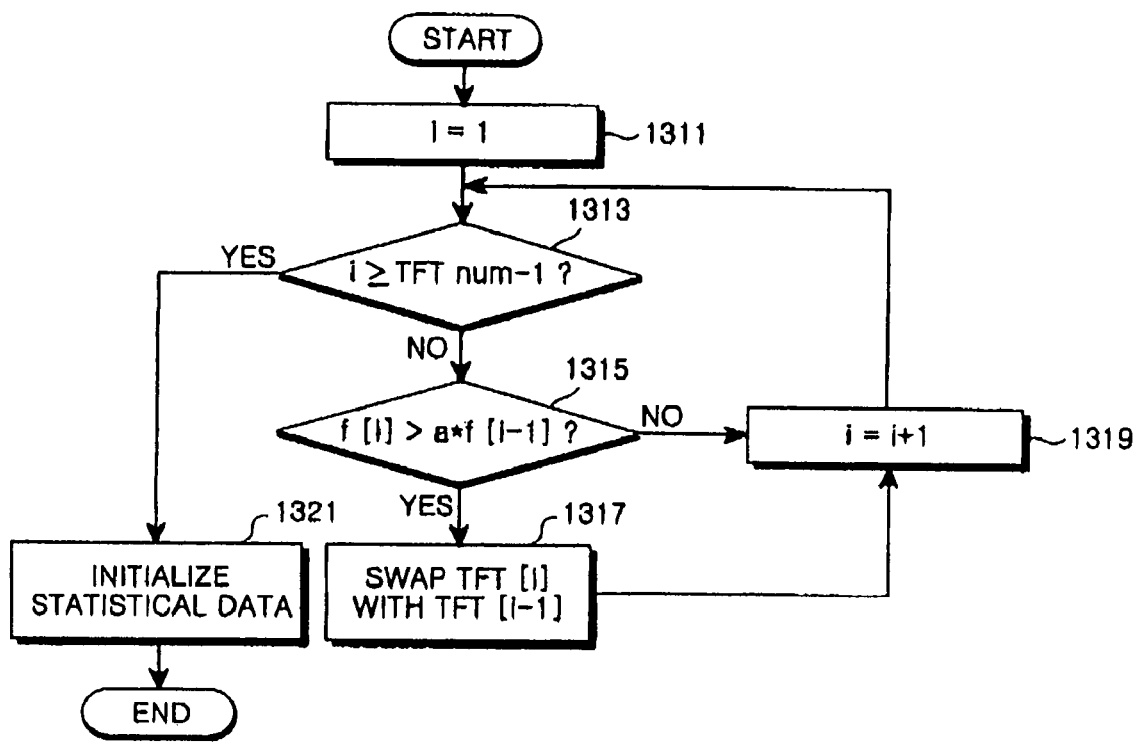
FIG. 13 is a diagram of a flowchart illustrating an example of steps for performing a primary TFT reordering procedure in accordance with an embodiment of the present invention.

FIG. 13 is a diagram of a flowchart illustrating an example of steps for performing a TFT reordering procedure in accordance with an embodiment of the present invention. Specifically, FIG. 13 is a flowchart illustrating a TFT reordering procedure by a primary TFT reordering procedure of the reordering procedure 1011.

Referring to FIG. 13, upon receiving a signal representing expiration of a preset time from the timer 1015, the primary TFT reordering procedure of the reordering procedure 1011 initializes a parameter 'i' for searching a TFT to 1 in step 1311, and then proceeds to step 1313. Herein, FTF [i] represents an $i^{th}$ TFT, f[i] represents the frequency of packet data passing through an $i^{th}$ GTP tunnel, and TFTnum represents the number of stored TFTs. In step 1313, the primary TFT reordering procedure determines whether the parameter 'i' is smaller than TFTnum−1. As a result of the determination, if the parameter 'i' is larger than or equal to TFTnum−1, the primary TFT reordering procedure proceeds to step 1321. In step 1321, the primary TFT reordering procedure initializes statistical data stored in the statistics table 1051 of the memory 1050, and then ends.

However, as a result of the determination in step 1313, if the parameter 'i' is smaller than TFTnum−1, the primary TFT reordering procedure proceeds to step 1315. In step 1315, the primary TFT reordering procedure determines whether f[i] is larger than a*f[i−1]. When f[i] is larger than a*f[i−1] the frequency of packet data passing through an $i^{th}$ GTP tunnel is larger than the frequency of packet data passing through an $(i-1)^{th}$ GTP tunnel. The frequency of packet data successfully packet filtered through an $i^{th}$ TFT is larger than the frequency of packet data successfully packet filtered through an $(i-1)^{th}$ TFT. Further, the parameter 'a' is a preset constant. For example, if the parameter 'a' is set to 1000 (a=1000), the primary TFT reordering procedure determines where the frequency of packet data passing through the $i^{th}$ GTP tunnel is 1000 or more times larger than frequency of packet data passing through the $(i-1)^{th}$ GTP tunnel. As a result of the determination, if the f[i] is larger than a*f[i−1], the primary TFT reordering procedure proceeds to step 1317. In step 1317, the primary TFT reordering procedure swaps the order of the $i^{th}$ TFT, i.e., TFT[i], with the $(i-1)^{th}$ TFT, i.e., TFT[i−1], and then proceeds to step 1319. However, as a result of the determination in step 1315, if the f[i] is smaller than or equal to a*f[i−1], the primary TFT reordering procedure proceeds to step 1319. In step 1319, the primary TFT reordering procedure increases the parameter 'i' by 1 (i=i+1), and then returns to step 1313.

As described in conjunction with FIG. 13, the primary TFT reordering procedure searches statistical data for each of the TFTs stored in the GGSN 119, and if the searched statistical data represents the frequency of packet data successfully packet filtered through a corresponding TFT is larger than a preset value, the primary TFT reordering procedure reorders TFTs in order to minimize a TFT packet filtering time of the packet data received from the external network, thereby contributing to an improvement in system performance.

Next, a TFT reordering procedure and a TFT packet filtering procedure by the primary TFT reordering procedure will be described with reference to FIGS. 14 and 15.

Figure 14:
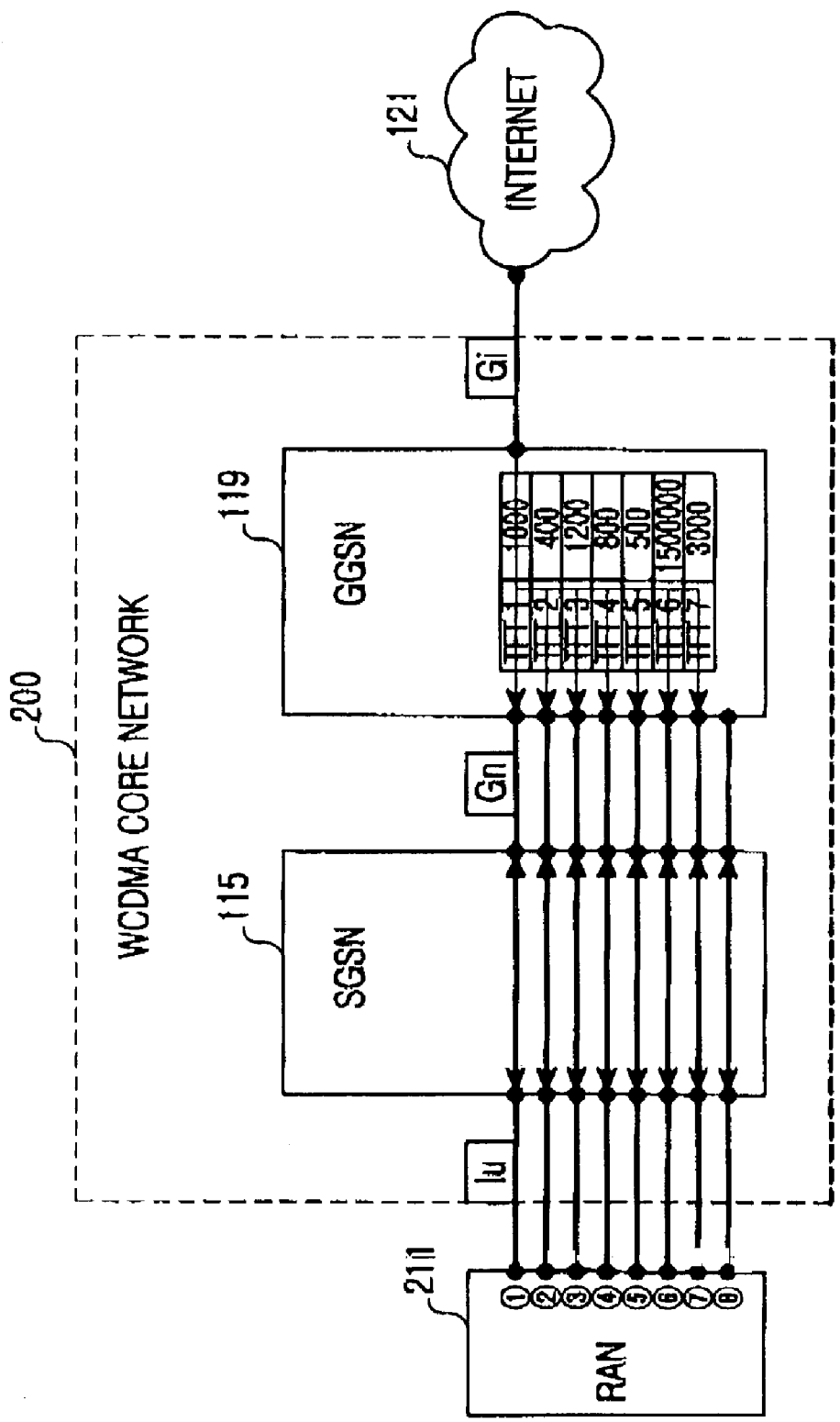
FIG. 14 is a block diagram illustrating an example of packet filtering before TFT reordering in a UMTS core network in accordance with an embodiment of the present invention.

Referring to FIG. 14, numerals shown in the 7 TFTs illustrated by TFT1 to TFT7 stored in the GGSN 119 represent the number of packet data that underwent packet filtering for each of the TFTs and then passed through a corresponding GTP tunnel. For convenience of explanation, it will be assumed that each packet data has the same size. Further, TFT1 corresponds to a GTP tunnel #1, and TFT2 corresponds to a GTP tunnel #2. In this way, TFT7 corresponds to a GTP tunnel #7. A GTP tunnel #8, since TFT is not stored, becomes a primary GTP tunnel generated by primary PDP context activation. Where there exist 1 primary GTP tunnel and 7 secondary GTP tunnels, if packet data is received from the external network, or the Internet 121, the received packet data is transmitted through a GTP tunnel of each TFT mapped through TFT packet filtering sequentially from the TFT1 to the TFT7. Therefore, as illustrated in FIG. 14, the number of packet data successfully TFT packet filtered through TFT1 is 1000, the number of packet data successfully TFT packet filtered through TFT2 is 400, the number of packet data successfully TFT packet filtered through TFT3 is 1200, the number of packet data successfully TFT packet filtered through TFT4 is 800, the number of packet data successfully TFT packet filtered through TFT5 is 500, the number of packet data successfully TFT packet filtered through TFT6 is 1500000, and the number of packet data successfully TFT packet filtered through TFT7 is 3000. Therefore, positions of the TFT5 and TFT6 are swapped during TFT reordering by the primary TFT reordering procedure described in conjunction with FIG. 13. The TFT positions being swapped by TFT reordering is illustrated in FIG. 15.

Figure 15:
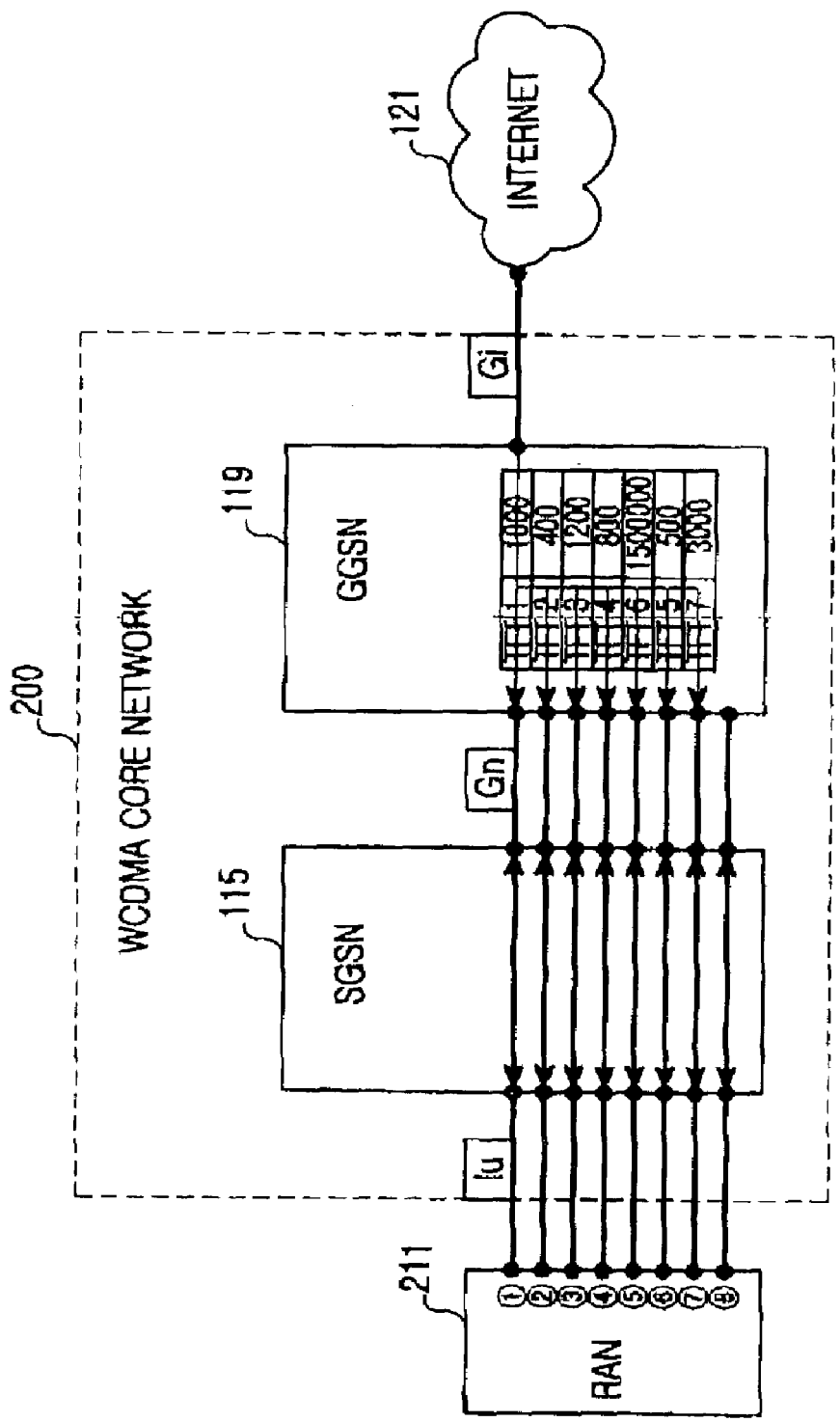
FIG. 15 is a block diagram illustrating an example of packet filtering after TFT reordering by a primary TFT reordering procedure in an UMTS core network in accordance with an embodiment of the present invention.

FIG. 15 is a block diagram illustrating an example of packet filtering after TFT reordering by a primary TFT reordering procedure in an UMTS core network in accordance with an embodiment of the invention. Referring to FIG. 15, compared with TFT positions before TFT reordering described in conjunction with FIG. 14, the positions of TFT5 and TFT6 are swapped. Assuming that an amount of calculations (hereinafter, referred to as "calculations" for short) occurring when the TFT packet filtering of FIG. 12 is performed once is defined as a unit amount of calculations (hereinafter, referred to as "unit calculation" for short), each time the order of TFT packet filtering for the received packet data is shifted backward, unit calculation for TFT packet filter is increased by 1. Unit calculation for TFT packet filtering before TFT reordering described in conjunction with FIG. 14, and unit calculation for TFT packet filter after TFT reordering described in conjunction with FIG. 15 will be described with reference to FIG. 16.

FIG. 16 illustrates a comparison between an amount of calculations for TFT packet filtering of FIG. 14 and an amount of calculations for TFT packet filtering of FIG. 15.

In FIG. 16, the two left columns represent TFT packet filtering calculations specifically, an amount of calculations for TFT packet filtering before TFT reordering. the two right columns represent TFT packet filtering calculations after TFT reordering. TFT packet filtering calculations before TFT reordering will be described with reference to FIG. 14. TFT packet filtering calculations at a GTP tunnel #n become a value determined by multiplying unit calculation specifically, a unit amount of calculations by the number of packet data where TFT packet filtering calculations at GTP tunnel #n=unit calculation*number of packet data. In FIG. 14, TFT packet filtering calculations at the GTP tunnel #1 to the GTP tunnel #7 are as follows.

TFT packet filtering calculations at GTP tunnel #1=1*1000=1000

TFT packet filtering calculations at GTP tunnel #2=2*400=800

TFT packet filtering calculations at GTP tunnel #3=3*1200=3600

TFT packet filtering calculations at GTP tunnel #4=4*800=3200

TFT packet filtering calculations at GTP tunnel #5=5*500=2500

TFT packet filtering calculations at GTP tunnel #6=6*1500000=9000000

TFT packet filtering calculations at GTP tunnel #7=7*3000=21000

TFT packet filtering calculations before TFT reordering in FIG. 14 become 9032100 in total.

Next, in FIG. 15, TFT packet filtering calculations at the GTP tunnel #1 to the GTP tunnel #7 are as follows.

TFT packet filtering calculations at GTP tunnel
1=1*1000=1000

TFT packet filtering calculations at GTP tunnel
2=2*400=800

TFT packet filtering calculations at GTP tunnel
3=3*1200=3600

TFT packet filtering calculations at GTP tunnel
4=4*800=3200

TFT packet filtering calculations at GTP tunnel
6=5*1500000=7500000

TFT packet filtering calculations at GTP tunnel
5=6*500=3000

TFT packet filtering calculations at GTP tunnel
7=7*3000=21000

TFT packet filtering calculations after TFT reordering in FIG. 15 become 7532600 in total.

As illustrated in FIG. 16, TFT packet filtering calculations for the packet data received from the external network before TFT reordering and after TFT reordering are reduced from 9032100 to 7532600, resulting in a performance improvement of 10.9068%. That is, by reordering TFTs corresponding to GTP tunnels where the frequency of packet data successfully TFT packet filtered is high, TFT packet filtering calculations are minimized, thus improving system performance.

A change in TFT packet filtering calculations according to a situation of received packet data will be described with reference to FIGS. 17 to 20.

FIG. 17 is a table illustrating an example of TFT packet filtering calculations by a primary TFT reordering procedure when an amount of TFT packet filterings on packet data for each of a plurality of TFTs is the same in accordance with an embodiment of the invention. It is assumed in FIG. 17 that the number of TFTs stored in the GGSN 119 is 7 and the number of packet data transmitted through GTP tunnels corresponding to the respective TFTs is given 1000000 at the remaining GTP tunnels except the GTP tunnel #5. In this case, compared with the remaining GTP tunnels, only the number of packet data transmitted through the GTP tunnel #5 is remarkably smaller than a preset value, e.g., 1000, so TFT reordering is performed.

In FIG. 17, TFT packet filtering calculations at the GTP tunnel #1 to the GTP tunnel #7 before TFT reordering are as follows.

TFT packet filtering calculations at GTP tunnel
1=1*1000000 =1000000

TFT packet filtering calculations at GTP tunnel
2=2*1000000=2000000

TFT packet filtering calculations at GTP tunnel
3=3*1000000=3000000

TFT packet filtering calculations at GTP tunnel
4=4*1000000=4000000

TFT packet filtering calculations at GTP tunnel
5=5*1000=5000

TFT packet filtering calculations at GTP tunnel
6=6*1000000=6000000

TFT packet filtering calculations at GTP tunnel
7=7*1000000=7000000

As a result, TFT packet filtering calculations before TFT reordering become 23005000 in total.

After the TFT reordering, a position of a TFT corresponding to the GTP tunnel #5 and a position of a TFT corresponding to the GTP tunnel #6 are swapped. In this case, TFT packet filtering calculations at the GTP tunnel #1 to the GTP tunnel #7 are as follows.

TFT packet filtering calculations at GTP tunnel
1=1*1000000=1000000

TFT packet filtering calculations at GTP tunnel
2=2*1000000=2000000

TFT packet filtering calculations at GTP tunnel
3=3*1000000=3000000

TFT packet filtering calculations at GTP tunnel
4=4*1000000=4000000

TFT packet filtering calculations at GTP tunnel
6=5*1000000=5000000

TFT packet filtering calculations at GTP tunnel
5=6*1000=6000

TFT packet filtering calculations at GTP tunnel
7=7*1000000=7000000

As a result, TFT packet filtering calculations after TFT reordering become 22006000 in total.

As illustrated in FIG. 17, TFT packet filtering calculations for the packet data received from the external network before TFT reordering and after TFT reordering are reduced from 23005000 to 22006000, resulting in a performance improvement of 4.5397%.

Next, FIG. 18 is a table illustrating an example of TFT packet filtering calculations by a primary TFT reordering procedure when an amount of TFT packet filterings on packet data for a specified one of a plurality of TFTs is large in accordance with an embodiment of the invention. It is assumed in FIG. 18 that the number of TFTs stored in the GGSN 119 is 7 and only the number of packet data transmitted through the GTP tunnel #6 among the numbers of packet data transmitted through GTP tunnels corresponding to the respective TFTs is remarkably large. In this case, compared with the remaining GTP tunnels, only the number of packet data transmitted through the GTP tunnel #6 is remarkably larger than a preset value, e.g., 1000, so TFT reordering is performed.

In FIG. 18, TFT packet filtering calculations at the GTP tunnel #1 to the GTP tunnel #7 before TFT reordering are as follows.

TFT packet filtering calculations at GTP tunnel
1=1*1=1

TFT packet filtering calculations at GTP tunnel
2=2*1=2

TFT packet filtering calculations at GTP tunnel
3=3*1=3

TFT packet filtering calculations at GTP tunnel
4=4*1=4

TFT packet filtering calculations at GTP tunnel
5=5*1=5

TFT packet filtering calculations at GTP tunnel
6=6*1000=6000

TFT packet filtering calculations at GTP tunnel
7=7*1=7

As a result, TFT packet filtering calculations before TFT reordering become 6022 in total.

After the TFT reordering, a position of a TFT corresponding to the GTP tunnel #6 and a position of a TFT corresponding to the GTP tunnel #5 are swapped. In this case, TFT packet filtering calculations at the GTP tunnel #1 to the GTP tunnel #7 are as follows.

TFT packet filtering calculations at GTP tunnel #1=1*1=1

TFT packet filtering calculations at GTP tunnel #2=2*1=2

TFT packet filtering calculations at GTP tunnel #3=3*1=3

TFT packet filtering calculations at GTP tunnel #4=4*1=4

TFT packet filtering calculations at GTP tunnel #6=5*1000=5000

TFT packet filtering calculations at GTP tunnel #5=6*1=6

TFT packet filtering calculations at GTP tunnel #7=7*1=7

As a result, TFT packet filtering calculations after TFT reordering become 5023 in total.

As illustrated in FIG. 18, TFT packet filtering calculations for the packet data received from the external network before TFT reordering and after TFT reordering are reduced from 6022 to 5023, resulting in a performance improvement of 19.8885%.

Referring now to FIG. 19 which illustrates an example of TFT packet filtering calculations by a primary TFT reordering procedure in the case where an amount of TFT packet filterings on packet data for a specified one of a plurality of TFTs is small in accordance with an embodiment of the invention. It is assumed in FIG. 19 that the number of TFTs stored in the GGSN 119 is 7 and only the number of packet data transmitted through the GTP tunnel #5 among the numbers of packet data transmitted through GTP tunnels corresponding to the respective TFTs is remarkably small. In this case, compared with the remaining GTP tunnels, only the number of packet data transmitted through the GTP tunnel #5 is remarkably smaller than a preset value, e.g., 1000, so TFT reordering is performed.

In FIG. 19, TFT packet filtering calculations at the GTP tunnel #1 to the GTP tunnel #7 before TFT reordering are as follows.

TFT packet filtering calculations at GTP tunnel #1=1*1000000=1000000

TFT packet filtering calculations at GTP tunnel #2=2*1000000=2000000

TFT packet filtering calculations at GTP tunnel #3=3*1000000=3000000

TFT packet filtering calculations at GTP tunnel #4=4*1000000=4000000

TFT packet filtering calculations at GTP tunnel #5=5*1=5

TFT packet filtering calculations at GTP tunnel #6=6*1000=6000

TFT packet filtering calculations at GTP tunnel #7=7*100000=700000

As a result, TFT packet filtering calculations before TFT reordering become 10706005 in total.

After the TFT reordering, a position of a TFT corresponding to the GTP tunnel #5 and a position of a TFT corresponding to the GTP tunnel #6 are swapped. In this case, TFT packet filtering calculations at the GTP tunnel #1 to the GTP tunnel #7 are as follows.

TFT packet filtering calculations at GTP tunnel #1=1*1000000=1000000

TFT packet filtering calculations at GTP tunnel #2=2*1000000=2000000

TFT packet filtering calculations at GTP tunnel #3=3*1000000=3000000

TFT packet filtering calculations at GTP tunnel #4=4*1000000=4000000

TFT packet filtering calculations at GTP tunnel #6=5*1000=5000

TFT packet filtering calculations at GTP tunnel #5=6*1=6

TFT packet filtering calculations at GTP tunnel #7=7*100000=700000

As a result, TFT packet filtering calculations after TFT reordering become 10705006 in total.

As illustrated in FIG. 19, TFT packet filtering calculations for the packet data received from the external network before TFT reordering and after TFT reordering are reduced from 10706005 to 10705006, resulting in a performance improvement of 0.0001%.

FIG. 20 is a table illustrating an example of TFT packet filtering calculations by a primary TFT reordering procedure in the case where each of a plurality of TFTs has a large difference in an amount of TFT packet filterings on packet data for a neighboring TFT in accordance with an embodiment of the invention. It is assumed in FIG. 20 that the number of TFTs stored in the GGSN 119 is 7 and a mutual difference between the numbers of packet data transmitted through the GTP tunnels corresponding to the respective TFTs is much larger than a preset value, e.g., 1000. In this case, TFT reordering is frequently performed between TFTs.

In FIG. 20, TFT packet filtering calculations at the GTP tunnel #1 to the GTP tunnel #7 before TFT reordering are as follows.

TFT packet filtering calculations at GTP tunnel #1=1*1=1

TFT packet filtering calculations at GTP tunnel #2=2*1000=2000

TFT packet filtering calculations at GTP tunnel #3=3*1000000=3000000

TFT packet filtering calculations at GTP tunnel #4=4*1000000000=4000000000

TFT packet filtering calculations at GTP tunnel #5=5*1000000000000=5000000000000

TFT packet filtering calculations at GTP tunnel #6=6*1000000000000000=6000000000000000

TFT packet filtering calculations at GTP tunnel #7=7*1000000000000000000=7000000000000000000

As a result, TFT packet filtering calculations before TFT reordering become 7006005004003002001 in total.

After the TFT reordering, positions of TFTs corresponding to the respective GTP tunnels are swapped as illustrated in FIG. 20. In this case, TFT packet filtering calculations at the GTP tunnel #1 to the GTP tunnel #7 are as follows.

TFT packet filtering calculations at GTP tunnel
2=1*1000=1000

TFT packet filtering calculations at GTP tunnel
3=2*1000000=2000000

TFT packet filtering calculations at GTP tunnel
4=3*1000000000=3000000000

TFT packet filtering calculations at GTP tunnel
5=4*1000000000000=4000000000000

TFT packet filtering calculations at GTP tunnel
6=5*1000000000000000=5000000000000000

TFT packet filtering calculations at GTP tunnel
7=6*1000000000000000000=6000000000000000000

TFT packet filtering calculations at GTP tunnel
1=7*1=7

As a result, TFT packet filtering calculations after TFT reordering become 6005004003002001007 in total.

As illustrated in FIG. 20, TFT packet filtering calculations for the packet data received from the external network before TFT reordering and after TFT reordering are reduced from 7006005004003002001 to 6005004003002001007, resulting in a performance improvement of 16.6669%.

Next, another TFT reordering procedure by the reordering procedure 1011 will be described with reference to FIG. 21.

Figure 21:
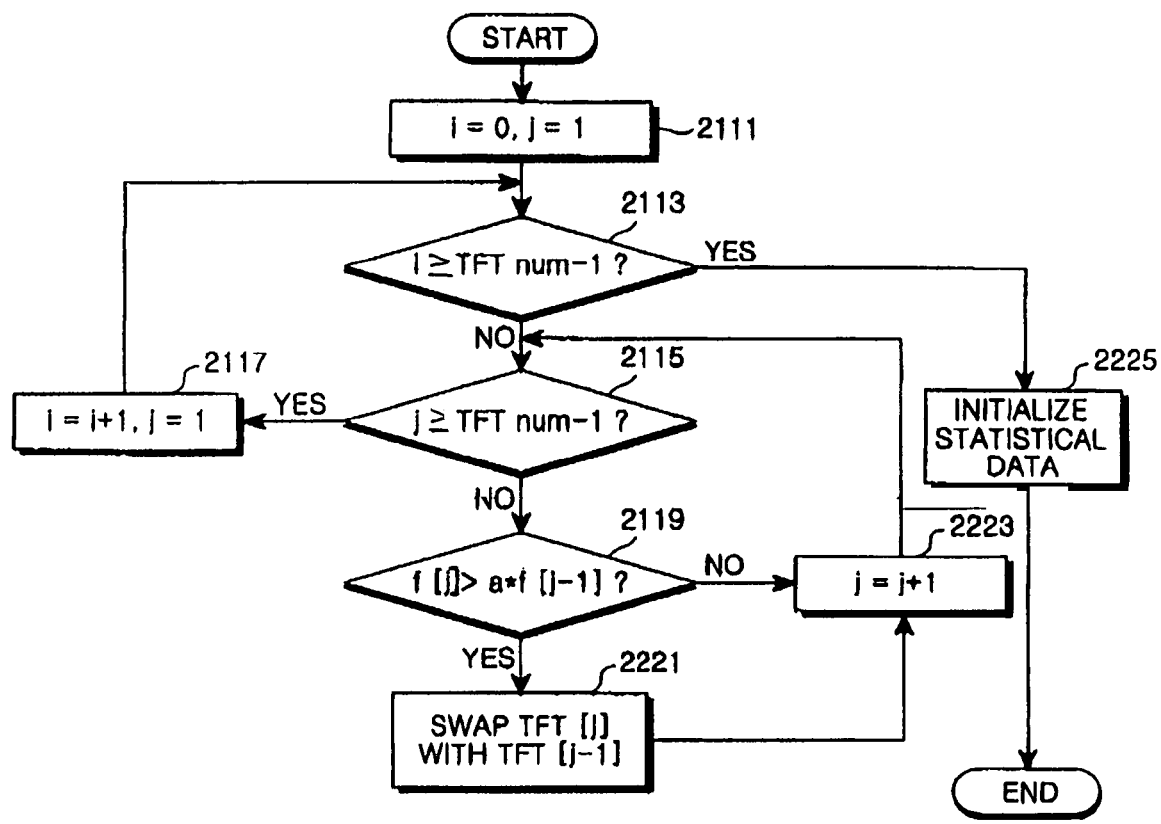
FIG. 21 is a diagram of a flowchart illustrating an example of steps for performing a secondary TFT reordering procedure in accordance with an embodiment of the present invention.

FIG. 21 is diagram of a flowchart illustrating an example of steps for performing a TFT reordering procedure in accordance with an embodiment of the invention. Specifically, FIG. 21 is a flowchart illustrating a TFT reordering procedure by a secondary TFT reordering procedure of the reordering procedure 1011.

Referring to FIG. 21, upon receiving a signal representing expiration of a preset time from the timer 1015, the secondary TFT reordering procedure of the reordering procedure 1011 initializes parameter 'i' and 'j' for searching a TFT to 1 in step 2111, and then proceeds to step 2113. Herein, FTF[i] represents an $i^{th}$ TFT, f[i] represents frequency of packet data passing through an $i^{th}$ GTP tunnel, and TFTnum represents the number of stored TFTs. In step 2113, the secondary TFT reordering procedure determines whether the parameter 'i' is smaller than TFTnum−1. As a result of the determination, if the parameter 'i' is larger than or equal to TFTnum−1, the secondary TFT reordering procedure proceeds to step 2225. In step 2225, the secondary TFT reordering procedure initializes statistical data for each of the TFTs stored in the statistics table 1051 of the memory 1050, and then ends.

However, as a result of the determination in step 2113, if the parameter 'i' is smaller than TFTnum−1, the secondary TFT reordering procedure proceeds to step 2115. In step 2115, the secondary TFT reordering procedure determines whether the parameter 'j' is larger than or equal to TFTnum−1. As a result of the determination, if the parameter 'j' is smaller than TFTnum−1, the secondary TFT reordering procedure proceeds to step 2117. In step 2117, the secondary TFT reordering procedure increases the parameter 'i' to i+1 by 1 (i=i+1) and initializes the parameter 'j' to 1 (j=1), and then returns to step 2113. As a result of the determination in step 2115, if the parameter 'j' is smaller than TFTnum−1, the secondary TFT reordering procedure proceeds to step 2119.

In step 2119, the secondary TFT reordering procedure determines whether f[j] is larger than a*f[j−1]. Here, that f[j] is larger than a*f[j−1] means that the frequency of packet data passing through a $j^{th}$ GTP tunnel is larger than the frequency of packet data passing through an $(j-1)^{th}$ GTP tunnel, so that the frequency of packet data successfully packet filtered through an $i^{th}$ TFT is larger than the frequency of packet data successfully packet filtered through an $(i-1)^{th}$ TFT. Further, the parameter 'a' is a preset constant. For example, if the parameter 'a' is set to 1000 (a=1000), the secondary TFT reordering procedure determines a case where the frequency of packet data passing through the $j^{th}$ GTP tunnel is at least 1000 times larger than frequency of packet data passing through the $(j-1)^{th}$ GTP tunnel. As a result of the determination, if the f[j] is larger than a*[j−1], the secondary TFT reordering procedure proceeds to step 2221. In step 2221, the secondary TFT reordering procedure swaps the order of the $j^{th}$ TFT, i.e., TFT[j], with the $(j-1)^{th}$ TFT, i.e., TFT[j−1], and then proceeds to step 2223. However, as a result of the determination in step 2119, if the f[j] is smaller than or equal to a*f[−1], the secondary TFT reordering procedure proceeds to step 2223. In step 2223, the secondary TFT reordering procedure increases the parameter 'j' by 1 (j=j+1), and then returns to step 2115.

Summarizing the TFT reordering procedure by the secondary TFT reordering procedure, the secondary TFT reordering procedure checks TFT statistical data for each of the TFTs stored in the GGSN 119, and if the statistical data of a specific TFT, i.e., frequency of packet data exceeds a preset value, the secondary TFT reordering procedure reorders TFTs to minimize a TFT search time during TFT packet filtering. That is, the secondary TFT reordering procedure is almost similar in operation to the primary TFT reordering procedure described in conjunction with FIG. 13. The secondary TFT reordering procedure is equivalent to repeatedly performing the primary TFT reordering procedure as many times as the number of TFTs stored in the GGSN 119. The secondary TFT reordering procedure repeats the primary TFT reordering procedure as many times as the number of TFTs to perform optimized TFT reordering for TFT packet filtering by repeatedly comparing the frequency of packet data for TFT packet filtering with a neighboring GTP tunnel.

Next, packet filtering after TFT reordering by the secondary TFT reordering procedure will be described with reference to FIG. 22.

Figure 22:
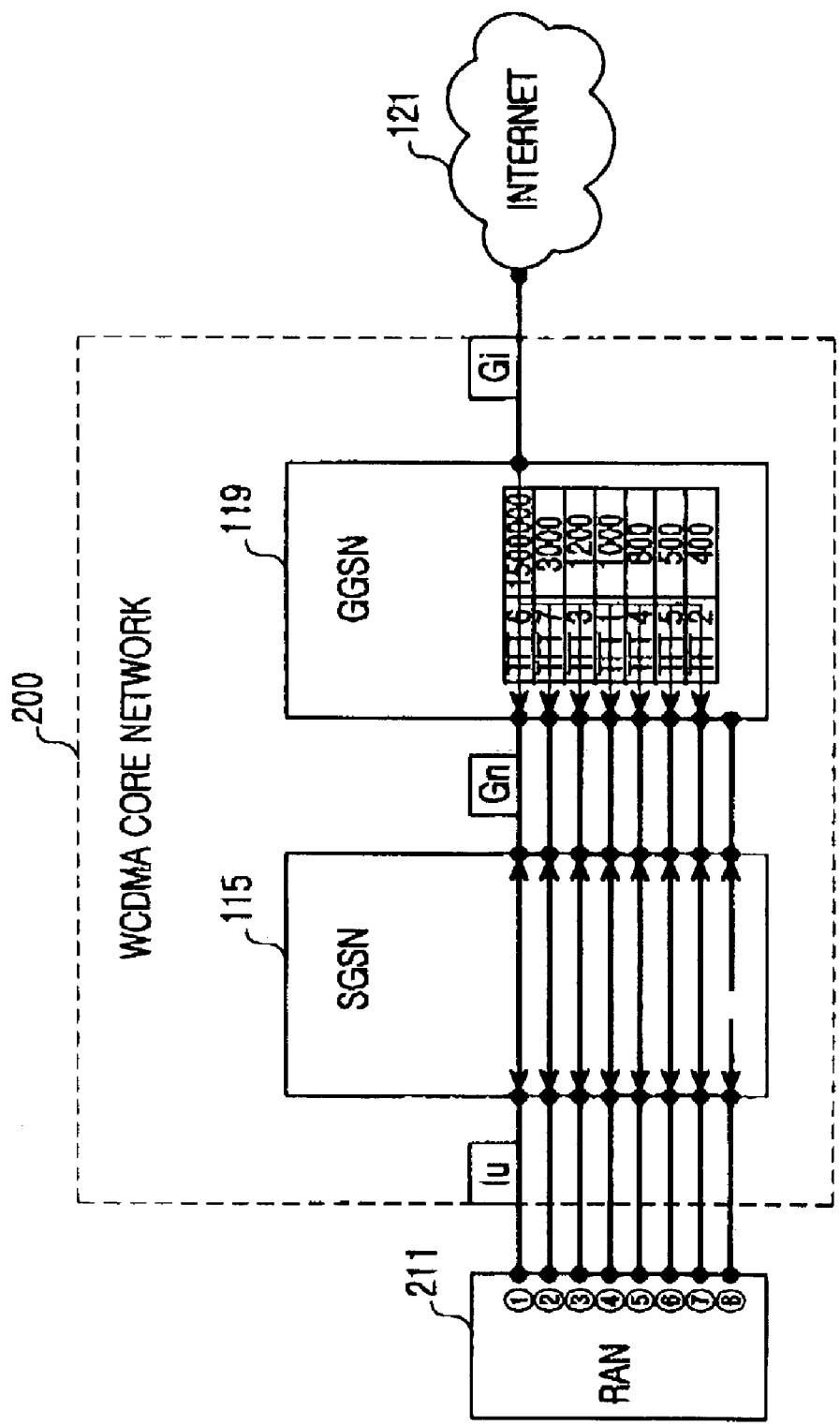
FIG. 22 is a block diagram illustrating an example of packet filtering after TFT reordering by a secondary TFT reordering procedure in a UMTS core network in accordance with an embodiment of the present invention.

FIG. 22 is a block diagram illustrating an example of packet filtering after TFT reordering by a secondary TFT reordering procedure in a UMTS core network in accordance with an embodiment of the invention. It will be assumed in FIG. 22 that packet filtering before TFT reordering is the same as described in conjunction with FIG. 14. Thereafter, if TFT reordering is performed by the secondary TFT reordering procedure, TFTs are reordered as illustrated in FIG. 22. As described in conjunction with FIG. 14, an amount of calculations for TFT packet filtering (hereinafter, referred to as "TFT packet filtering calculations" for short) before TFT reordering is 9032100, and TFT packet filtering calculations after TFT reordering of FIG. 22 will be described with reference to FIG. 23.

FIG. 23 is a table illustrating an example of a comparison between an amount of calculations for TFT packet filtering of FIG. 14 and an amount of calculations for TFT packet filtering of FIG. 22 in accordance with an embodiment of the invention.

Referring to FIG. 23, two left columns represent TFT packet filtering calculations specifically, an amount of calculations for TFT packet filtering before TFT reordering, and two right columns represent TFT packet filtering calculations after TFT reordering by the secondary TFT reordering procedure, as described in conjunction with FIG. 16. As illustrated, an amount of calculations for TFT packet filtering before TFT reordering is 9032100, and an amount of calculations for TFT packet filtering after TFT reordering by the secondary TFT reordering procedure is as follows.

In FIG. 23, TFT packet filtering calculations at the GTP tunnel #1 to the GTP tunnel #7 are as follows.

TFT packet filtering calculations at GTP tunnel
6=1*1500000=1500000

TFT packet filtering calculations at GTP tunnel
7=2*3000=6000

TFT packet filtering calculations at GTP tunnel
3=3*1200=3600

TFT packet filtering calculations at GTP tunnel
1=4*1000=4000

TFT packet filtering calculations at GTP tunnel
4=5*800=4000

TFT packet filtering calculations at GTP tunnel
5=6*500=3000

TFT packet filtering calculations at GTP tunnel
2=7*400=2800

As a result, TFT packet filtering calculations after TFT reordering become 1555800 in total.

As illustrated in FIG. 23, TFT packet filtering calculations for the packet data received from the external network before TFT reordering and after TFT reordering are reduced from 9032100 to 1555800, resulting in a performance improvement of 82.7748%. Further, compared with TFT reordering by the primary TFT reordering procedure, TFT reordering by the secondary TFT reordering procedure secures performance improvement of about 63%. The TFT reordering by the secondary TFT reordering procedure is superior to TFT reordering by the primary TFT reordering procedure in terms of performance improvement because a TFT having the highest frequency of packet data is first used for TFT packet filtering.

Next, a change in TFT packet filtering calculations according to a situation of received packet data will be described with reference to FIGS. 24 to 27.

FIG. 24 is a table illustrating an example of TFT packet filtering calculations by a secondary TFT reordering procedure when an amount of TFT packet filterings on packet data for each of a plurality of TFTs is the same in accordance with an embodiment of the invention. It is assumed in FIG. 24 that the number of TFTs stored in the GGSN 119 is 7 and the number of packet data transmitted through GTP tunnels corresponding to the respective TFTs is equally given 1000000 at the remaining GTP tunnels except for the GTP tunnel #5. In this case, compared with the remaining GTP tunnels, only the number of packet data transmitted through the GTP tunnel #5 is remarkably smaller than a preset value, e.g., 1000, so TFT reordering is performed.

In FIG. 24, TFT packet filtering calculations at the GTP tunnel #1 to the GTP tunnel #7 before TFT reordering are equal in amount to the TFT packet filtering calculations before TFT reordering by the primary TFT reordering procedure, described in conjunction with FIG. 17, so a detailed description thereof will not be provided. After TFT reordering by the secondary TFT reordering procedure, a position of TFT corresponding to the GTP tunnel #5 and a position of TFT corresponding to the GTP tunnel #6 are swapped. In this case, TFT packet filtering calculations at the GTP tunnel #1 to the GTP tunnel #7 are as follows.

TFT packet filtering calculations at GTP tunnel
1=1*1000000=1000000

TFT packet filtering calculations at GTP tunnel
2=2*1000000=2000000

TFT packet filtering calculations at GTP tunnel
3=3*1000000=3000000

TFT packet filtering calculations at GTP tunnel
4=4*1000000=4000000

TFT packet filtering calculations at GTP tunnel
6=5*1000000=5000000

TFT packet filtering calculations at GTP tunnel
7=6*1000000=6000000

TFT packet filtering calculations at GTP tunnel
5=7*1000=7000

As a result, TFT packet filtering calculations after TFT reordering become 21007000 in total.

As illustrated in FIG. 24, TFT packet filtering calculations for the packet data received from the external network before TFT reordering and after TFT reordering are reduced from 23005000 to 21007000, resulting in a performance improvement of 8.6851% Further, compared with TFT reordering by the primary TFT reordering procedure, TFT reordering by the secondary TFT reordering procedure secures performance improvement of about 5%.

FIG. 25 is a table illustrating an example of TFT packet filtering calculations by a secondary TFT reordering procedure when an amount of TFT packet filterings on packet data for a specified one of a plurality of TFTs is large in accordance with an embodiment of the invention. It is assumed in FIG. 25 that the number of TFTs stored in the GGSN 119 is 7 and only the number of packet data transmitted through the GTP tunnel #6 among the numbers of packet data transmitted through GTP tunnels corresponding to the respective TFTs is remarkably large. In this case, compared with the remaining GTP tunnels, only the number of packet data transmitted through the GTP tunnel #6 is remarkably larger than a preset value, e.g., 1000, so TFT reordering is performed.

In FIG. 25, TFT packet filtering calculations before TFT reordering by the secondary TFT reordering procedure are equal in amount to the TFT packet filtering calculations before TFT reordering by the primary TFT reordering procedure, described in conjunction with FIG. 18, so a detailed description thereof will not be provided. After TFT reordering by the secondary TFT reordering procedure, TFTs are reordered as illustrated in FIG. 25. After the TFT reordering, TFT packet filtering calculations at the GTP tunnel #1 to the GTP tunnel #7 are as follows.

TFT packet filtering calculations at GTP tunnel
6=1*1000=1000

TFT packet filtering calculations at GTP tunnel
1=2*1=2

TFT packet filtering calculations at GTP tunnel
2=3*1=3

TFT packet filtering calculations at GTP tunnel
3=4*1=4

TFT packet filtering calculations at GTP tunnel
4=5*1=5

TFT packet filtering calculations at GTP tunnel
5=6*1=6

TFT packet filtering calculations at GTP tunnel
7=7*1=7

As a result, TFT packet filtering calculations after TFT reordering become 1027 in total.

As illustrated in FIG. 25, TFT packet filtering calculations for the packet data received from the external network before TFT reordering and after TFT reordering are reduced from 6022 to 1027, resulting in a performance improvement of 82.9459%. Further, compared with TFT reordering by the primary TFT reordering procedure, TFT reordering by the secondary TFT reordering procedure secures performance improvement of about 63%.

FIG. 26 is a table illustrating an example of TFT packet filtering calculations by a secondary TFT reordering procedure when an amount of TFT packet filterings on packet data for a specified one of a plurality of TFTs is small in accordance with an embodiment of the invention. It is assumed in FIG. 26 that the number of TFTs stored in the GGSN 119 is 7 and only the number of packet data transmitted through the GTP tunnel #5 among the numbers of packet data transmitted through GTP tunnels corresponding to the respective TFTs is remarkably small. In this case, compared with the remaining GTP tunnels, only the number of packet data transmitted through the GTP tunnel #5 is remarkably smaller than a preset value, e.g., 1000, so TFT reordering is performed.

In FIG. 26, TFT packet filtering calculations before TFT reordering by the secondary TFT reordering procedure are equal in amount to the TFT packet filtering calculations before TFT reordering by the primary TFT reordering procedure, described in conjunction with FIG. 19, so a detailed description thereof will not be provided. After TFT reordering by the secondary TFT reordering procedure, TFTs are reordered as illustrated in FIG. 26. After the TFT reordering, TFT packet filtering calculations at the GTP tunnel #1 to the GTP tunnel #7 are as follows.

TFT packet filtering calculations at GTP tunnel
1=1*1000000=1000000

TFT packet filtering calculations at GTP tunnel
2=2*1000000=2000000

TFT packet filtering calculations at GTP tunnel
3=3*1000000=3000000

TFT packet filtering calculations at GTP tunnel
4=4*1000000=4000000

TFT packet filtering calculations at GTP tunnel
7=5*100000=5000000

TFT packet filtering calculations at GTP tunnel
5=6*1000=6000

TFT packet filtering calculations at GTP tunnel
6=7*1=7

As a result, TFT packet filtering calculations after TFT reordering become 10506007 in total.

As illustrated in FIG. 26, TFT packet filtering calculations for the packet data received from the external network before TFT reordering and after TFT reordering are reduced from 10706005 to 10506007, resulting in a performance improvement of 1.8681%. Further, compared with TFT reordering by the primary TFT reordering procedure, TFT reordering by the secondary TFT reordering procedure secures performance improvement of about 2%.

FIG. 27 is a table illustrating an example of TFT packet filtering calculations by a secondary TFT reordering procedure when each of a plurality of TFTs has a large difference in an amount of TFT packet filterings on packet data for a neighboring TFT in accordance with an embodiment of the invention. It is assumed in FIG. 27 that the number of TFTs stored in the GGSN 119 is 7 and a mutual difference between the numbers of packet data transmitted through the GTP tunnels corresponding to the respective TFTs is much larger than a preset value, e.g., 1000. In this case, TFT reordering is frequently performed between TFTs.

In FIG. 27, TFT packet filtering calculations before TFT reordering by the secondary TFT reordering procedure are equal in amount to the TFT packet filtering calculations before TFT reordering by the primary TFT reordering procedure, described in conjunction with FIG. 20, so a detailed description thereof will not be provided. After TFT reordering by the secondary TFT reordering procedure, TFTs are reordered as illustrated in FIG. 27. After the TFT reordering, TFT packet filtering calculations at the GTP tunnel #1 to the GTP tunnel #7 are as follows.

TFT packet filtering calculations at GTP tunnel
7=1*1000000000000000000=1000000000000000000

TFT packet filtering calculations at GTP tunnel
6=2*1000000000000000=2000000000000000

TFT packet filtering calculations at GTP tunnel
5=3*1000000000000=3000000000000

TFT packet filtering calculations at GTP tunnel
4=4*1000000000=4000000000

TFT packet filtering calculations at GTP tunnel
3=5*1000000=5000000

TFT packet filtering calculations at GTP tunnel
2=6*1000=6000

TFT packet filtering calculations at GTP tunnel
1=7*1=7

As a result, TFT packet filtering calculations after TFT reordering become 1002003004005006007 in total.

As illustrated in FIG. 27, TFT packet filtering calculations for the packet data received from the external network before TFT reordering and after TFT reordering are reduced from 7006005004003002001 to 1002003004005006007, resulting in performance improvement of 85.6979%. Further, compared with TFT reordering by the primary TFT reordering procedure, TFT reordering by the secondary TFT reordering procedure secures performance improvement of about 69%.

As described above, in the mobile communication system, the present invention performs TFT reordering according to the frequency of packet data received from an external network, thereby minimizing TFT packet filtering calculations. The minimization in number of TFT packet filtering calculations contributes to a simplified transmission procedure for packet data received from the external network, resulting in an improvement of system performance.

While the invention has been shown and described with reference to a certain embodiments thereof, it will be understood by those skilled in the art that various changes in form and details may be made therein without departing from the spirit and scope of the invention as defined by the appended claims.

What is claimed is:

1. An apparatus for reordering traffic flow templates (TFTs) in a mobile communication system including a primary General Packet Radio Service (GPRS) tunneling protocol (GTP) tunnel for transmitting and receiving packet data to and from a mobile station and one or more secondary GTP tunnels having the same mobile station address as the primary GTP tunnel and each being divided into different TFTs, the TFTs each including different packet filter contents so that the secondary GTP tunnels are separated using TFT packet filtering, the apparatus comprising:

a controller adapted to
sequentially perform TFT packet filtering on input packet data for the TFTs;
manage statistical data of packet data that are successfully TFT packet filtered for the TFTs;
reorder an order of the TFTs by comparing the statistical data of the packet data that are successfully TFT packet filtered for the TFTs if a preset period expires; and
a memory adapted to store packet filter contents for each of the TFTs, and store statistical data for packet data that are successfully TFT packet filtered for each of the TFTs.

2. The apparatus of claim 1, wherein the controller is further adapted to sequentially reorder the TFTs in order of a highest frequency of packet data that are successfully packet filtered.

3. The apparatus of claim 1, wherein the controller comprises:

a TFT packet filter adapted to sequentially perform TFT packet filtering on the input packet data with respect to the TFTs;
a statistical processor adapted to manage statistical data for the packet data that are successfully TFT packet filtered for each of the TFTs;
a timer adapted to count the preset period, and generate a signal representing an expiration of the preset period; and
a reordering device adapted to sequentially reorder the TFTs in order of high frequency of packet data that are successfully TFT packet filtered by comparing statistical data of the packet data that are successfully TFT packet filtered for the TFTs according to the generated signal.

4. The apparatus of claim 1, wherein the controller is further adapted to initialize statistical data of the packet data that are successfully TFT packet filtered for each of the TFTs, after reordering the TFTs.

5. The apparatus of claim 1, wherein the controller is further adapted to compare frequencies of packet data that are successfully TFT packet filtered for two consecutive TFTs among the TFTs, and reorder the TFTs by swapping the order of the two TFTs if there is a difference between the frequencies of the packet data.

6. The apparatus of claim 1, wherein the controller is further adapted to sequentially reorder the TFTs in order of high frequency of the packet data that are successfully TFT packet filtered, if the frequency of the packet data that are successfully TFT packet filtered is larger than a multiple preset between the TFTs.

7. The apparatus of claim 1, wherein the controller is further adapted to reorder the TFTs by swapping the order of consecutive TFTs among the TFTs, if frequency of the packet data that are successfully TFT packet filtered for the two consecutive TFTs is larger than a multiple preset between the two consecutive TFTs.

8. A method for reordering traffic flow templates (TFTs) in a mobile communication system including a primary GPRS (General Packet Radio Service) tunneling protocol (GTP) tunnel for transmitting and receiving packet data to/from a mobile station and one or more secondary GTP tunnels having the same mobile station address as the primary GTP tunnel and each being divided into different TFTs, the TFTs each including different packet filter contents so that the secondary GTP tunnels are separated through TFT packet filtering, the method comprising the steps of:

sequentially performing TFT packet filtering on input packet data for the TFTs, and managing statistical data of packet data that are successfully TFT packet filtered for the TFTs;
comparing statistical data of the packet data that are successfully TFT packet filtered for each of the TFTs, if a preset period expires; and
reordering an order of the TFTs based on the comparison result of the statistical data.

9. The method of claim 8, wherein the TFTs are sequentially reordered in order of high frequency of packet data that are successfully packet filtered.

10. The method of claim 8, further comprising the step of initializing statistical data of the packet data that are successfully TFT packet filtered for each of the TFTs, after reordering the TFTs.

11. The method of claim 8, wherein the TFT reordering step comprises the step of comparing frequencies of packet data that are successfully TFT packet filtered for two consecutive TFTs among the TFTs, and reordering the TFTs by swapping the order of the two TFTs if there is a difference between the frequencies of packet data.

12. The method of claim 8, wherein the TFT reordering step comprises the step of sequentially reordering the TFTs in order of high frequency of the packet data that are successfully TFT packet filtered, if the frequency of the packet data that are successfully TFT packet filtered is larger than a multiple preset between the TFTs.

13. The method of claim 8, wherein the TFT reordering step comprises the step of reordering the TFTs by swapping the order of two consecutive TFTs among the TFTs, if the frequency of the packet data that are successfully TFT packet filtered for the two consecutive TFTs is larger than a multiple preset between the two consecutive TFTs.

* * * * *